(12) United States Patent
Staniek

(10) Patent No.: US 7,067,569 B2
(45) Date of Patent: Jun. 27, 2006

(54) MIXTURES OF PHOSPHORUS-CONTAINING COMPOUNDS USED AS POLYMER STABILIZERS

(75) Inventor: Peter Staniek, Binzen (DE)

(73) Assignee: Clariant Finance (BVI) Limited, Tortola (VG)

( * ) Notice: Subject to any disclaimer, the term of this patent is extended or adjusted under 35 U.S.C. 154(b) by 53 days.

(21) Appl. No.: 10/332,479

(22) PCT Filed: Jul. 13, 2001

(86) PCT No.: PCT/IB01/01255

§ 371 (c)(1),
(2), (4) Date: Jan. 8, 2003

(87) PCT Pub. No.: WO02/06390

PCT Pub. Date: Jan. 24, 2002

(65) Prior Publication Data

US 2003/0187111 A1     Oct. 2, 2003

(30) Foreign Application Priority Data

Jul. 14, 2000   (CH) .................................. 1390/00

(51) Int. Cl.
*C08K 5/50* (2006.01)
*C08K 5/524* (2006.01)

(52) U.S. Cl. .................. 524/117; 524/119; 524/128; 524/135; 524/140; 524/141; 524/142; 524/151; 524/152; 524/153; 524/154

(58) Field of Classification Search ............... 524/117, 524/126–130, 132–136, 140–142, 147, 151–154, 524/119; 252/400.2–400.24, 400.21, 400.22, 252/400.23
See application file for complete search history.

(56) References Cited

U.S. PATENT DOCUMENTS

| | | | | |
|---|---|---|---|---|
| 3,363,014 A | * | 1/1968 | Kittleman et al. .......... | 585/378 |
| 3,519,584 A | | 7/1970 | Juredine ...................... | 524/128 |
| 5,002,702 A | | 3/1991 | Wolf et al. .................. | 252/609 |
| 5,362,783 A | * | 11/1994 | Eiffler et al. ................ | 524/154 |
| 5,488,079 A | | 1/1996 | Staniek ........................ | 524/116 |
| 5,616,636 A | | 4/1997 | Avar et al. ................... | 524/102 |
| 5,744,526 A | * | 4/1998 | Goossens et al. ............. | 524/90 |
| 5,919,933 A | | 7/1999 | Gaa et al. ..................... | 546/222 |
| 5,972,248 A | | 10/1999 | Stahrfeldt et al. ........... | 252/601 |
| 6,103,796 A | | 8/2000 | Staniek et al. ............... | 524/100 |
| 6,126,861 A | | 10/2000 | Bechtold ...................... | 252/401 |
| 6,172,232 B1 | | 1/2001 | Stahrfeldt et al. ........... | 546/155 |
| 6,174,940 B1 | | 1/2001 | Stahrfeldt et al. ............ | 524/99 |
| 6,225,385 B1 | | 5/2001 | Stahrfeldt et al. ........... | 524/119 |
| 6,362,300 B1 | * | 3/2002 | Araki et al. ................... | 528/28 |
| 6,362,358 B1 | | 3/2002 | Gronmaier et al. .......... | 558/95 |
| 6,388,121 B1 | | 5/2002 | Gronmaier et al. ........... | 558/95 |

FOREIGN PATENT DOCUMENTS

| | | |
|---|---|---|
| FR | 2 739 381 | 4/1997 |
| GB | 2 012 279 | 7/1979 |
| GB | 2 227 490 | 8/1990 |
| GB | 2 293 827 | 4/1996 |
| GB | 2 306 478 | 5/1997 |

OTHER PUBLICATIONS

XP-00533987, Haruna T., "Aspects of Stabilization with Phosphorus Antioxidants in Polymers", Angewandte Makromolekulare Chemie. Applied Macromolecular Chemistry and Physics, Wiley VCH, Weinheim, DE, vol. 232, Oct. 1, 1995, pp. 119-131.

* cited by examiner

*Primary Examiner*—Peter Szekely
(74) *Attorney, Agent, or Firm*—Anthony A. Bisulca

(57) ABSTRACT

The invention relates to a synergistic mixture comprising
a) at least one compound selected from the group consisting of the phosphites of the formula (I) to (V), of the phosphonites of the formulae (VI) to (IX) and (XV), of the di/oligophosphonites of the formulae (X) and (XI) and of the phosphinites of the formulae (XII) to (XIV), and
b) at least one compound selected from the group consisting of the phosphanes of the formula (XVI), the di/oligophosphanes of the formulae (XVII) and (XVIII), and of the cyclophosphanes of the formula (XIX),
and also to a process for stabilizing polymers with respect to thermooxidative degradation by addition and incorporation of a synergistic mixture of this type.

17 Claims, No Drawings

MIXTURES OF PHOSPHORUS-CONTAINING COMPOUNDS USED AS POLYMER STABILIZERS

The invention relates to mixtures which comprise phosphites, phosphonites, phosphinites, in particular aromatic phosphonites or phosphites (component 1) and tertiary phosphanes (component 2) and also to a process for stabilizing polymers with respect to degradation induced by heat or by mechanical stress, using mixtures of this type.

Surprisingly, it has been found that mixtures which comprise compounds of component 1 together with those of component 2 are more effective than the corresponding components alone as stabilizers for polymeric compounds.

As is known to the person skilled in the art, phosphites, phosphonites and/or phosphinites are used for stabilizing polymers with respect to thermooxidative degradation during their processing. The use of triphenylphosphane (triphenylphosphine; TPP) on its own has also been described in this connection. The stabilizing action of substances of this type is seen in that polymers stabilized in this way have substantially unchanged melt viscosity (this being a measure of constancy of molar mass) and also better color performance, i.e. a lower level of coloration after extrusion when compared with unstabilized polymers.

If mixtures of two or more additives are used, it is to be expected that properties will change linearly as a function of their mixing ratios.

However, for mixtures from the two components 1 and 2 defined above it has been found that there is an advantageous deviation from this linearity with regard to melt flow stabilization and/or color stabilization, in comparison with the linear change to be expected between the values for the individual components. This type of behavior is termed synergistic.

According to the invention, a mixture is provided comprising a component 1 as constituent (a) and a component 2 as constituent (b).

Component 1 is composed of one or more compounds of the formulae (I) to (XV):

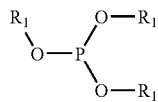

(I)

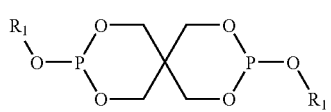

(II)

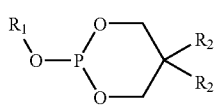

(III)

-continued

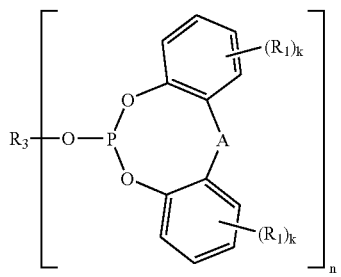

(IV)

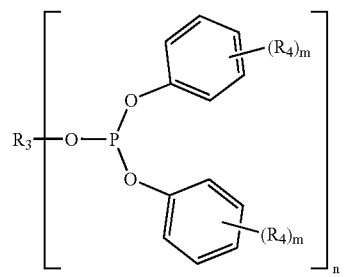

(V)

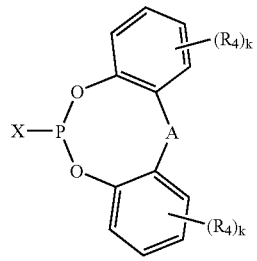

(VI)

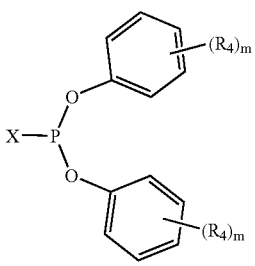

(VII)

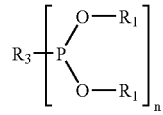

(VIII)

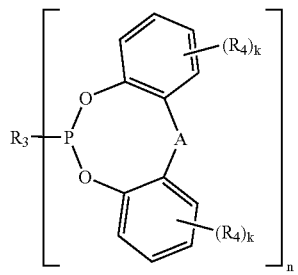

(IX)

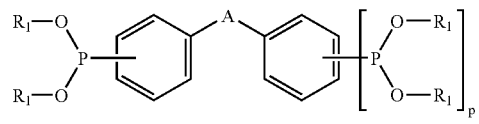

(X)

-continued

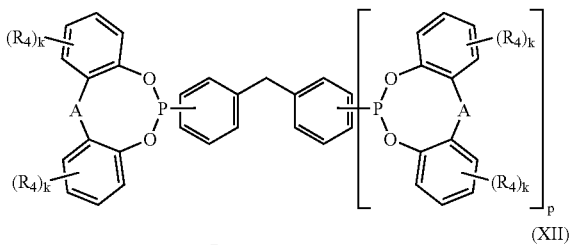
(XI)

(XII)

(XIII)

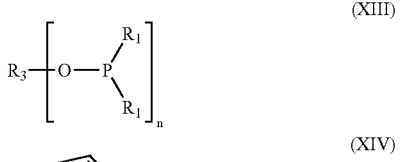
(XIV)

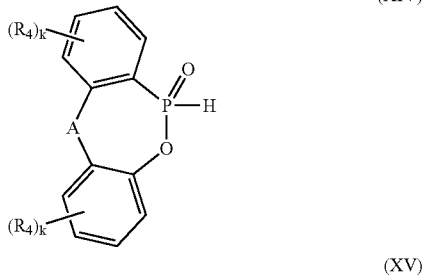
(XV)

Component 2 is one or more compounds of the general structures shown in formulae (XVI) to (XIX):

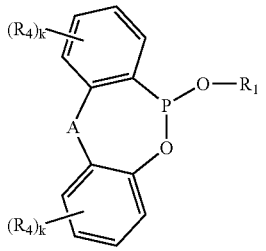
(XVI)

(XVII)

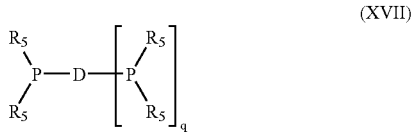
(XVIII)

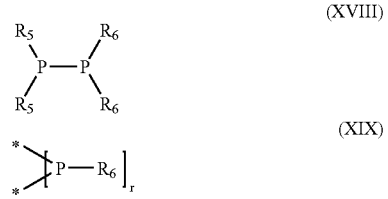
(XIX)

where, independently of one another, $R_1$ is $C_1$–$C_{24}$-alkyl (linear or branched, where appropriate also containing heteroatoms N, O, P, S), $C_5$–$C_{30}$-cycloalkyl (where appropriate also containing heteroatoms N, O, P, S), $C_1$–$C_{30}$-alkylaryl, $C_6$–$C_{24}$-aryl or heteroaryl, $C_6$–$C_{24}$-aryl or heteroaryl (substituted with the groups $C_1$–$C_{18}$-alkyl (linear or branched), $C_5$–$C_{12}$-cycloalkyl or $C_1$–$C_{18}$-alkoxy);

$R_2$ is H, $C_1$–$C_{24}$-alkyl (linear or branched, where appropriate also containing heteroatoms N, O, P, S), $C_5$–$C_{30}$-cycloalkyl (where appropriate also containing heteroatoms N, O, P, S), $C_1$–$C_{30}$-alkylaryl, $C_6$–$C_{24}$-aryl or heteroaryl, $C_6$–$C_{24}$-aryl or heteroaryl (substituted with the groups $C_{10}$–$C_{18}$-alkyl (linear or branched), $C_5$–$C_{12}$-cycloalkyl or $C_1$–$C_{18}$-alkoxy);

$R_3$ is n-valent groups of the type $C_1$–$C_{30}$-alkylene (linear or branched, where appropriate also containing heteroatoms N, O, P, S), $C_1$–$C_{30}$-alkylidene (where appropriate also containing heteroatoms N, O, P, S), $C_5$–$C_{12}$-cycloalkylene or $C_6$–$C_{24}$-arylene (where appropriate substituted with $C_1$–$C_{18}$-alkyl (linear or branched, $C_5$–$C_{12}$-cycloalkyl or $C_1$–$C_{18}$ alkoxy);

$R_4$ is $C_1$–$C_{24}$-alkyl (linear or branched, where appropriate also containing heteroatoms N, O, P, S), $C_5$–$C_{30}$-cycloalkyl (where appropriate also containing heteroatoms N, O, P, S), $C_1$–$C_{30}$-alkylaryl, $C_6$–$C_{24}$-aryl or heteroaryl, $C_6$–$C_{24}$-aryl or heteroaryl (substituted with the groups $C_1$–$C_{18}$-alkyl (linear or branched), $C_5$–$C_{12}$cycloalkyl or $C_1$–$C_{18}$-alkoxy);

$R_5$ is $C_1$–$C_{24}$-alkyl (linear or branched, where appropriate also containing heteroatoms N, O, P, S), $C_5$–$C_{30}$-cycloalkyl (where appropriate also containing heteroatoms N, O, P, S), $C_1$–$C_{30}$-alkylaryl, $C_6$–$C_{24}$-aryl or heteroaryl, $C_6$–$C_{24}$-aryl or heteroaryl (substituted with the groups $C_1$–$C_{18}$-alkyl (linear or branched), $C_5$–$C_{12}$-cycloalkyl or $C_1$–$C_{18}$-alkoxy);

$R_6$ $C_1$–$C_{24}$-alkyl (linear or branched, where appropriate also containing heteroatoms N, O, P, S), $C_5$–$C_{30}$-cycloalkyl (where appropriate also containing heteroatoms N, O, P, S), $C_1$–$C_{30}$-alkylaryl, $C_6$–$C_{24}$-aryl or heteroaryl, $C_6$–$C_{24}$-aryl or heteroaryl (substituted with the groups $C_1$–$C_{18}$-alkyl (linear or branched), $C_5$–$C_{12}$-cycloalkyl or $C_1$–$C_{18}$-alkoxy);

A is a direct bond, $C_1$–$C_{30}$-alkylidene (where appropriate also containing heteroatoms N, O, P, S), >NH, >NR, —S—, >S(O), >S(O)$_2$, —O—;

D is q-valent groups of the type $C_1$–$C_{30}$-alkylene (linear, branched, where appropriate also containing heteroatoms N, O, P, S), $C_1$–$C_{30}$-alkylidene (where appropriate also containing heteroatoms N, O, P, S), $C_5$–$C_{12}$-cycloalkylene (where appropriate also containing heteroatoms N, O, P, S) or $C_6$–$C_{24}$-arylene (where appropriate also substituted with $C_1$–$C_{18}$-alkyl (linear or branched, $C_5$–$C_{12}$-cycloalkyl or $C_1$–$C_{18}$ alkoxy), —O—, —S—;

X is Cl, Br, F, OH (including the resultant tautomeric form >P(O)H);

k is from 0 to 4;

n is from 1 to 4;

m is from 0 to 5;

p is 0 or 1;

q is from 1 to 5;

r is from 3 to 6, where the groups P—$R_6$ in formula (XIX) are a constituent of a phosphacycle, indicated by * on the bonds emanating from P.

Preference is given to compounds where the radicals $R_1'$ is $C_6$–$C_{12}$-cycloalkyl (where appropriate also containing heteroatoms N, O, P, S), $C_2$–$C_{24}$-alkylaryl, $C_6$–$C_{24}$-aryl or heteroaryl, $C_6$–$C_{24}$-aryl or heteroaryl (substituted with the groups $C_1$–$C_{12}$-alkyl (linear or branched), $C_5$–$C_8$-cycloalkyl or $C_1$–$C_{12}$-alkoxy);

$R_2'$ is H, $C_1$–$C_{12}$-alkyl (linear or branched, where appropriate also containing heteroatoms N, O, P, S), $C_5$–$C_{12}$-cycloalkyl (where appropriate also containing heteroatoms N, O, P, S), $C_1$–$C_{18}$-alkylaryl, $C_6$–$C_{24}$-aryl or heteroaryl, $C_6$–$C_{24}$-aryl or heteroaryl (substituted with the groups $C_1$–$C_{12}$-alkyl (linear or branched), $C_5$–$C_8$-cycloalkyl or $C_1$–$C_{12}$-alkoxy);

$R_3'$ is n-valent groups of the type $C_1$–$C_{14}$-alkylene (linear or branched, where appropriate also containing heteroatoms N, O, P, S), $C_1$–$C_{18}$-alkylidene (where appropriate also containing heteroatoms N, O, P, S), $C_5$–$C_8$-cycloalkylene or $C_6$–$C_{24}$-arylene (where appropriate also substituted with $C_1$–$C_{18}$-alkyl (linear or branched), $C_5$–$C_8$-cycloalkyl or $C_1$–$C_{12}$-alkoxy);

$R_4'$ is $C_1$–$C_{18}$-alkyl (linear or branched, where appropriate also containing heteroatoms N, O, P, S), $C_5$–$C_{12}$-cycloalkyl (where appropriate also containing heteroatoms N, O, P, S), $C_1$–$C_{24}$-alkylaryl, $C_6$–$C_{24}$-aryl or heteroaryl, $C_6$–$C_{24}$-aryl or heteroaryl (substituted with the groups $C_1$–$C_{18}$-alkyl (linear or branched), $C_5$–$C_8$-cycloalkyl or $C_1$–$C_{12}$-alkoxy);

$R_5'$ is $C_{18}$–$C_{18}$-alkyl (linear or branched, where appropriate also containing heteroatoms N, O, P, S), $C_5$–$C_{12}$-cycloalkyl (where appropriate also containing heteroatoms N, O, P, S), $C_1$–$C_{18}$-alkylaryl, $C_6$–$C_{24}$-aryl or heteroaryl, $C_6$–$C_{24}$-aryl or heteroaryl (substituted with the groups $C_1$–$C_{18}$-alkyl (linear or branched), $C_5$–$C_8$-cycloalkyl or $C_1$–$C_{12}$-alkoxy);

$R_6'$ is $C_5$–$C_{18}$-alkyl (linear or branched, where appropriate also containing heteroatoms N, O, P, S), $C_5$–$C_{12}$-cycloalkyl (where appropriate also containing heteroatoms N, O, P, S), $C_1$–$C_{18}$-alkylaryl, $C_6$–$C_{24}$-aryl or heteroaryl, $C_6$–$C_{24}$-aryl or heteroaryl (substituted with the groups $C_1$–$C_{18}$-alkyl (linear or branched), $C_5$–$C_8$-cycloalkyl or $C_1$–$C_{12}$-alkoxy);

A' is a direct bond, $C_1$–$C_{18}$-alkylidene (where appropriate also containing heteroatoms N, O, P, S), >NH, —S—, —O—;

D' is q'-valent groups of the type $C_1$–$C_{24}$-alkylene (linear, branched, where appropriate also containing heteroatoms N, O, P, S), $C_1$–$C_{24}$-alkylidene (where appropriate also containing heteroatoms N, O, P, S), $C_5$–$C_8$-cycloalkylene (where appropriate also containing heteroatoms N, O, P, S) or $C_6$–$C_{24}$-arylene (where appropriate also substituted with $C_1$–$C_{18}$-alkyl (linear or branched), $C_5$–$C_8$-cycloalkyl or $C_1$–$C_{12}$-alkoxy);

X' is F or OH (including the resultant tautomeric form >P(O)H);

k' is from 0 to 3;
n' is from 1 to 4;
m' is from 0 to 3;
p' is 0 or 1;
q' is from 1 to 4;
r' is 4 or 5, where the groups P—$R_6$ in the formula (XIX) are a constituent of a phosphacycle, indicated by * on the bonds emanating from P.

Particular preference is given to compounds where the radicals, $R_1''$ is $C_6$–$C_{24}$-aryl or heteroaryl, $C_6$–$C_{24}$-aryl or heteroaryl (substituted with the groups $C_1$–$C_{12}$-alkyl (linear or branched), $C_5$–$C_8$-cycloalkyl or $C_1$–$C_{12}$-alkoxy);

$R_2''$ is $C_1$–$C_8$-alkyl (linear or branched), $C_5$–$C_8$-cycloalkyl, $C_1$–$C_{18}$-alkylaryl, $C_6$–$C_{12}$-aryl or heteroaryl, $C_6$–$C_{12}$-aryl or heteroaryl (substituted with the groups $C_1$–$C_{12}$-alkyl (linear or branched), $C_6$–$C_8$-cycloalkyl or $C_1$–$C_8$-alkoxy);

$R_3''$ is n-valent groups of the type $C_1$–$C_{12}$-alkylene (linear or branched where appropriate also containing heteroatoms N or P), $C_1$–$C_{12}$-alkylidene (where appropriate also containing heteroatoms N or P), $C_6$–$C_8$-cycloalkylene, or $C_6$–$C_{12}$-arylene (where appropriate also substituted with $C_1$–$C_{12}$-alkyl (linear or branched), $C_6$–$C_8$-cycloalkyl or $C_1$–$C_8$-alkoxy);

$R_4''$ is $C_1$–$C_8$-alkyl (linear or branched), $C_5$–$C_8$-cycloalkyl, $C_1$–$C_{18}$-alkylaryl, $C_6$–$C_{12}$-aryl or heteroaryl, $C_6$–$C_{12}$-aryl or heteroaryl (substituted with the groups $C_1$–$C_{12}$-alkyl (linear or branched), $C_6$–$C_8$-cycloalkyl or $C_1$–$C_8$-alkoxy);

$R_5''$ is $C_{12}$–$C_{18}$-alkyl (linear or branched, where appropriate also containing heteroatoms N, O, P, S), $C_6$–$C_8$-cycloalkyl, $C_1$–$C_{12}$-alkylaryl, $C_6$–$C_{18}$-aryl or heteroaryl, $C_6$–$C_{18}$-aryl or heteroaryl (substituted with the groups $C_1$–$C_8$-alkyl (linear or branched), $C_6$–$C_8$-cycloalkyl or $C_1$–$C_8$-alkoxy);

$R_6''$ is $C_5$–$C_{12}$-alkyl (linear or branched), $C_5$–$C_8$-cycloalkyl, $C_1$–$C_{12}$-alkylaryl, $C_6$–$C_{24}$-aryl or heteroaryl, $C_6$–$C_{24}$-aryl or heteroaryl (substituted with the groups $C_1$–$C_{18}$-alkyl (linear or branched), $C_5$–$C_8$-cycloalkyl or $C_1$–$C_{12}$-alkoxy);

A" is a direct bond, $C_1$–$C_{18}$-alkylidene (where appropriate also containing heteroatoms N, O, P, S), >NH, —S—, —O—;

D" is q"-valent groups of the type $C_1$–$C_{24}$-alkylene (linear, branched, where appropriate also containing heteroatoms N, O, P, S), $C_1$–$C_{24}$-alkylidene (where appropriate also containing heteroatoms N, O, P, S), $C_5$–$C_8$-cycloalkylene (where appropriate also containing heteroatoms N, O, P, S), or $C_6$–$C_{24}$-arylene (where appropriate also substituted with $C_1$–$C_{18}$-alkyl (linear or branched), $C_5$–$C_8$-cycloalkyl or $C_1$–$C_{12}$-alkoxy);

X" is F or OH (including the resultant tautomeric form >P(O)H);

k" is from 0 to 3;
n" is from 1 to 4;
m" is from 0 to 3;
p" is 0 or 1;
q" is from 1 to 4;
r" is 4 or 5, where the groups P—$R_6$ in the formula (XIX) are a constituent of a phosphacycle indicated by * on the bonds emanating from P.

Particularly suitable mixtures are all of those which can be formed by combining the components 1 and 2 specified below:

Component 1
compound mixtures whose main component is tetrakis(di-tert-butylphenyl) biphenylyl-diphosphonite,
tris(2,4-di-tert-butylphenyl) phosphite
bis(2,4-di-tert-butylphenyl) pentaerythrityl diphosphite
bis(2,4-(1,1-dimethylbenzyl)phenyl) pentaerythrityl diphosphite
bis(2,6-di-tert-butyl-4-methylphenyl) pentaerythrityl diphosphite
bis(octadecyl) pentaerythrityl diphosphite
tris(nonylphenyl) phosphite
2,2',2"-nitrilotriethyl tris(3,3'-5,5'-tetra-tert-butyl-1,1'-biphenyl-2,2'-diyl phosphite)
bis(2,4-di-tert-butyl-6-methylphenyl) ethyl phosphite
2-(2,4,6-tri-tert-butylphenoxy)-5-butyl-5-ethyl-1,3,2-dioxaphosphorinane
methylene-2,2'-bis(4,6-di-tert-butylphenyl) 2-ethylhexyl phosphite 1,1-ethylidene-2,2'-bis(4,6-di-tert-butylphenyl) fluorophosphite Component 2
triphenylphosphane
tris(2 methylphenyl)phosphane
tris(4 methylphenyl)phosphane
tris(2 methoxyphenyl)phosphane
tris(4 methoxyphenyl)phosphane
tetracyclohexyl cyclotetraphosphane
tetratert-butyl cyclotetraphosphane
tetrabiphenylyl cyclotetraphosphane
tetraphenyl cyclotetraphosphane
pentaphenyl cyclopentaphosphane
tetraphenyl diphosphane
tetracyclohexyl diphosphane
bis(diphenylphosphino)methane
1,2-bis(diphenylphosphino)ethane
1,3-bis(diphenylphosphino)propane
1,4-bis(diphenylphosphino)butane
1,5-bis(diphenylphosphino)pentane
1,6-bis(diphenylphosphino)hexane
1,8-bis(diphenylphosphino)octane
1,3-bis(diphenylphosphino)-2,2-dimethylpropane
1,1,1-tris(diphenylphosphinomethyl)methane
1,1,1-tris(diphenylphosphinomethyl)ethane
1,1,1-tris(diphenylphosphinomethyl)propane
1,1,1-tris(diphenylphosphinomethyl)butane
1,1,1-tris(diphenylphosphinomethyl)-1-phenylmethane
1,3-bis(diphenylphosphinomethyl)-2-diphenylphosphinopropane
1,3-bis(diphenylphosphino)-2-methylpropane Of these mixtures, any particular preference is given to the following mixtures of components 1 and 2:

A) where component 1 is tris(2,4-di-tert-butylphenyl) phosphite and component 2 is tri-phenylphosphane;
B) where component 1 is bis(2,4-di-tert-butylphenyl) pentaerythrityl diphosphite and component 2 is triphenylphosphane;
C) where component 1 is a mixture composed of tetrakis(di-tert-butylphenyl) biphenylyldiphosphonite, bis(2,4-di-tert-butylphenyl) biphenylmonophosphonite and tris(2,4-di-tert-butylphenyl) phosphite (referred to hereinafter as PS-1) and component 2 is triphenylphosphane;
D) where component 1 is tris(nonylphenyl) phosphite and component 2 is triphenylphosphane;
E) where component 1 is 2-(2,4,6-tri-tert-butylphenoxy)-5-butyl-5-ethyl-1,3,2-dioxaphos-phorinane and component 2 is triphenylphosphane;
F) where component 1 is tris(2,4-di-tert-butylphenyl) phosphite and component 2 is 1,3-bis(diphenylphosphino)-2,2-dimethylpropane;
G) where component 1 is bis(2,4-di-tert-butylphenyl) pentaerythrityl diphosphite and component 2 is 1,3-bis(diphenylphosphino)-2,2-dimethylpropane;
H) where component 1 encompasses the compounds of mixture PS-1 and component 2 is 1,3-bis(diphenylphosphino)-2,2-dimethylpropane;
I) where component 1 is tris(nonylphenyl) phosphite and component 2 is 1,3-bis-(diphenylphosphino)-2,2-dimethylpropane;
J) where component 1 is 2-(2,4,6-tri-tert-butylphenoxy)-5-butyl-5-ethyl-1,3,2-dioxaphos-phorinane and component 2 is 1,3-bis(diphenylphosphino)-2,2-dimethylpropane;
K) where component 1 is tris(2,4-di-tert-butylphenyl) phosphite and component 2 is 1,1,1-tris(diphenylphosphinomethyl)ethane;
L) where component 1 is bis(2,4-di-tert-butylphenyl) pentaerythrityl diphosphite and component 2 is 1,1,1-tris(diphenylphosphinomethyl)ethane;
M) where component 1 encompasses the compounds of mixture PS-1 and component 2 is 1,1,1-tris(diphenylphosphinomethyl)ethane;
N) where component 1 is tris(nonylphenyl) phosphite and component 2 is 1,1,1-tris(di-phenylphosphinomethyl)ethane;
O) where component 1 is 2-(2,4,6-tri-tert-butylphenoxy)-5-butyl-5-ethyl-1,3,2-dioxaphos-phorinane and component 2 is 1,1,1-tris(diphenylphosphinomethyl)ethane;
P) where component 1 is tris(2,4-di-tert-butylphenyl) phosphite and component 2 is 1,1,1-tris(diphenylphosphinomethyl)propane;
Q) where component 1 is bis(2,4-di-tert-butylphenyl) pentaerythrityl diphosphite and component 2 is 1,1,1-tris(diphenylphosphinomethyl)propane;
R) where component 1 encompasses the compounds of mixture PS-1 and component 2 is 1,1,1-tris(diphenylphosphinomethyl)propane;
S) where component 1 is tris(nonylphenyl) phosphite and component 2 is 1,1,1-tris(di-phenylphosphinomethyl)propane;
T) where component 1 is 2-(2,4,6-tri-tert-butylphenoxy)-5-butyl-5-ethyl-1,3,2-dioxaphos-phorinane and component 2 is 1,1,1-tris(diphenylphosphinomethyl)propane.

The amount of component 1 present in the mixtures of the invention is from 1 to 99% by weight, and that of component 2 is from 99 to 1% by weight.

Preferred amounts of component 1 are from 5 to 95% by weight, particularly preferably from 10 to 90% by weight, and preferred amounts of component 2 are from 95 to 5% by weight, particularly preferably from 90 to 10% by weight.

The concentration used of the mixture of the invention varies with the nature of the polymer. The person skilled in the art can readily establish the amount suitable for any given case, but typical amounts, based on the polymeric material to be stabilized, are from 0.001 to 5% by weight, preferably from 0.005 to 3% by weight, particularly preferably from 0.01 to 2% by weight.

The mixtures made from components 1 and 2 may be prepared by simple mixing, by mixing in the melt, by dissolving or dispersing one component in the liquid or molten other component, by mixing two melts, or by joint melting, in each case followed, if required, by a cooling step. Mixtures of the invention are also obtained by mixing and concentrating solutions of the components in suitable solvents. The preparation of the mixtures may either be a batch process in suitable apparatus, such as a variety of mixers or reactors, etc., or else continuous, e.g. in extruders or continuous mixers or kneaders or on roll mills. Compacting, pelletization, pressing, extruding, or some other method, may then be used to produce a suitable commercial form, if this is needed.

The invention also provides a process for stabilizing polymeric materials with respect to thermooxidative degradation. This process encompasses the addition and incorporation of a stabilizing amount of the mixture of the invention in solid or molten form, in solution (preferably as liquid concentrate) or as a solid masterbatch (if useful) prior to, during or (usually) after the polymerization stage, in amounts such that the stabilizer concentration achieved is from 0.001 to 5% by weight, preferably from 0.005 to 3% by weight, particularly preferably from 0.01 to 2% by weight, based on the polymer to be stabilized.

A liquid concentrate of this type encompasses from 10 to 80% by weight of an inventive mixture and from 90 to 20% by weight of a solvent.

A masterbatch of this type (also termed a solid base-compound) encompasses from 10 to 80% by weight, preferably from 40 to 70% by weight, particularly preferably from 15 to 40% by weight, of a mixture of the invention, and from 90 to 20% by weight, preferably from 60 to 30% by weight particularly preferably from 85 to 60% by weight, of a polymeric material which is identical or compatible with the polymeric material to be stabilized.

All of the components of the mixture of the invention may be prepared from known compounds, using known methods. An overview of reaction processes to prepare components 1 and 2 is found, for example, in G. M. Kosolapoff, Organic Phosphorus Compounds, Vols. 1–7, Wiley Verlag, New York, 1972, or in Houben/Weyl, Methoden der Organischen Chemie [Methods of organic chemistry], Vol. 12, 4th Edition, Georg Thieme Verlag, Stuttgart, 1963, and in corresponding supplementary volumes. Using this information, the person skilled in the art can prepare the compounds described above. The content of these references is incorporated herein by way of reference.

Compounds of the formula (XVIII) and compounds of the formula (XIX) are also prepared by a process which encompasses reacting either a secondary phosphane of the formula $R'_1R'_1PH$ or a primary phosphane of the formula $R'_1PH_2$ with a halogen, preferably chlorine or bromine, where appropriate in the presence of an acid scavenger, such as an oxide, hydroxide or carbonate of an alkali metal or of an alkaline earth metal, or of an amine, preferably of a tertiary amine, and where appropriate in the presence of an inert solvent. Secondary phosphanes give compounds of the formula (XVIII). Primary phosphanes give compounds of the formula (XIX). In this process it is advantageous to use alkylphosphanes as starting materials, these being more readily available on a large scale than the halophosphanes used in the prior art. Examples of detailed descriptions of this process are given in FR 2739381 or GB 2306478.

Alternatively, and usually, compounds of this type are prepared from organic halides, such as alkyl or aryl chlorides, or alkyl or aryl bromides, and $PCl_3$, via a Grignard reaction or modified Wurtz reaction; or via a Friedel-Crafts reaction; or by an addition reaction of a P—H-containing compound onto multiple bonds, or by Arbuzov reaction of organic diphosphinites with organic halides, followed by reduction, or via derivatization of previously formed phosphanes.

The mixtures of the invention made from components 1 and 2 may be used as processing stabilizers for polymeric materials, preferably for 1. Polymers of monoolefins and diolefins, for example polypropylene, polyisobutylene, polybut-1-ene, poly-4-methylpent-1-ene, polyisoprene or polybutadiene, as well as polymers of cycloolefins, for example of cyclopentene or norbornene; furthermore polyethylene (which optionally can be crosslinked); for example, high density polyethylene (PE-HD), low-density polyethylene (PE-LD), linear low density polyethylene (PE-LLD), branched low density polyethylene (PE-BLD) Polyolefins, i.e. polymers of monoolefins, in particular polyethylene and polypropylene, can be prepared by various, and especially by the following, methods:
   a) free-radical polymerization (normally under high pressure and at elevated temperature)
   b) catalytic polymerization using a catalyst that normally contains one or more metals of group IVb, Vb, VIb or VIII of the Periodic Table. These metals usually have one or more ligands, such as oxides, halides, alcoholates, esters, ethers, amines, alkyls, alkenyls and/or aryls that may be either π- or σ-coordinated. These metal complexes may be in the free form or fixed on substrates, for example on activated magnesium chloride, titanium chloride, alumina or silicon oxide. These catalysts may be soluble or insoluble in the polymerization medium. The catalysts can be active as such in the polymerization or further activators may be used, for example metal alkyls, metal hydrides, metal alkyl halides, metal alkyl oxides or metal alkyloxanes, the metals being elements of groups Ia, IIa and/or IIIa of the Periodic Table. The activators may be modified, for example, with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), e.g. mixtures of polypropylene with polyisobutylene, polypropylene with polyethylene (e.g. PP/HDPE, PP/LDPE) and mixtures of various grades of polyethylene (e.g. LDPE/HDPE).

3. Copolymers of monoolefins and diolefins with each other or with other vinyl monomers, for example ethylene-propylene copolymers, linear low density polyethylene (PE-LLD) and mixtures thereof with low density polyethylene (PE-LD), propylene-but-1-ene copolymers, propylene-isobutylene copolymers, ethylene-but-1-ene copolymers, ethylene-hexene copolymers, ethylene-methyl-pentene copolymers, ethylene-heptene copolymers, ethylene-octene copolymers, propylene-butadiene copolymers, isobutylene and isoprene copolymers, ethylene-alkyl acrylate copolymers, ethylene-alkyl methacrylate copolymers, ethylene-vinyl acetate copolymers and their copolymers with carbon monoxide, or ethylene-acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned under 1), for example polypropylene-ethylene-propylene copolymers, PE-LD-ethylene-vinyl acetate copolymers, PE-LD-ethylene-acrylic acid copolymers, PE-LLD-ethylene-vinyl acetate copolymers, PE-LLD-ethylene-acrylic acid copolymers and alternating or random polyalkylene-carbon monoxide copolymers and mixtures thereof with other polymers, for example polyamides.

4. Hydrocarbon resins (for example $C_5$–$C_9$) including hydrogenated modifications thereof (e.g. tackifier resins) and mixtures of polyalkylenes and starch.

5. Polystyrene, poly(p-methylstyrene), poly(α-methylstyrene).

6. Copolymers of styrene or a-methylstyrene with dienes or acrylic derivatives, for example styrene-butadiene, styrene-acrylonitrile, styrene-alkyl methacrylate, styrene-butadiene-alkyl acrylate, styrene-butadiene-alkyl methacrylate, styrene-maleic anhydride, styrene-acrylonitrile-methacrylate; mixtures of high impact strength of styrene copolymers and another polymer, for example a polyacrylate, a diene polymer or an ethylene-propylene-diene terpolymer; and block copolymers of styrene, such as styrene-butadiene-styrene, styrene-isoprene-styrene, styrene-ethylene/butylene-styrene or styrene-ethylene/propylene-styrene.

7. Graft copolymers of styrene or α-methylstyrene, for example styrene on polybutadiene, styrene on polybutadiene-styrene or polybutadiene-acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or alkyl methacrylates on polybutadiene, styrene and acrylonitrile on ethylene-propylene-diene terpolymers, styrene and acrylonitrile on polyalkyl acrylates or polyalkyl methacrylates, styrene and acrylonitrile on acrylate-butadiene copolymers, as well as mixtures thereof with the copolymers mentioned under 6), for example the copolymer mixtures known as ABS, MBS, ASA or AES polymers.

8. Halogen-containing polymers, such as polychloroprene, chlorinated rubber, chlorinated or sulphochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride; as well as copolymers thereof such as vinyl chloride-vinylidene chloride, vinyl chloride-vinyl acetate or vinylidene chloride-vinyl acetate.

9. Polymers derived from α,β-unsaturated acids and derivatives thereof, such as polyacrylates and polymethacrylates, polyacrylonitriles, polyacrylamides and polymethyl methacrylates impact-modified with butyl acrylate.

10. Copolymers of the monomers mentioned under 9) with each other or with other unsaturated monomers, for example acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

11. Polymers derived from unsaturated alcohols and amines or the acyl derivatives or acetals thereof, such as polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in section 1.

12. Homopolymers and copolymers of cyclic ethers, such as polyalkylene glycols, polyethylene oxide, polypropylene oxide or copolymers thereof with bisglycidyl ethers.

13. Polyacetals such as polyoxymethylene and those polyoxymethylenes which contain comonomers, for example ethylene oxide; polyacetals modified with thermoplastic polyurethanes, acrylates or MBS.

14. Polyphenylene oxides and sulphides, and mixtures thereof with styrene polymers or polyamides.

15. Polyurethanes derived from hydroxyl-terminated polyethers, polyesters and polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, such as polyamide 4, 6, 6/6, 6/10, 6/9, 6/12, 4/6, 12/12, 11 and 12, aromatic polyamides starting from m-xylene, diamine and adipic acid; polyamides prepared from hexamethylenediamine and isophthalic and/or terephthalic acid and with or without an elastomer as modifier, for example poly-2,4,4-trimethylhexamethylene terephthalamide or poly-m-phenylene isophthalamide. Block copolymers of the aforementioned polyamides with polyolefins, olefin copolymers, ionomers or chemically bonded or grafted elastomers, or with polyethers, e.g. with polyethylene glycol, polypropylene glycol or polytetramethylene glycol. As well as polyamides or copolyamides modified with EPDM or ABS; and polyamides condensed during processing (RIM polyamide systems).

17. Polyureas, polyimides, polyamide-imides and polybenzimidazoles.

18. Polyesters derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates, as well as block polyether-esters derived from hydroxyl-terminated polyethers; and also polyesters modified with polycarbonates or MBS.

19. Polycarbonates and polyester carbonates.

20. Polysulphones, polyether sulphones and polyether ketones.

21. Crosslinked polymers derived from aldehydes on the one hand and phenols, urea or melamine on the other hand, such as phenol/formaldehyde resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example from epoxy acrylates, urethane acrylates or polyester acrylates.

25. Alkyd resins, polyester resins and acrylic resins crosslinked with melamine resins, urea resins, polyisocyanates or epoxy resins.

26. Crosslinked epoxy resins which derive from polyepoxides, e.g. from bis-glycidyl ethers or from cycloaliphatic diepoxides.

27. Natural polymers such as cellulose, natural rubber, gelatin and derivatives thereof which have been chemically modified in a polymer-homologous manner, for example cellulose acetates, cellulose propionates and cellulose butyrates, or the cellulose ethers such as methyl cellulose; as well as rosins and derivatives.

28. Mixtures (polyblends) of the aforementioned polymers, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/PE-HD, PA/PP, PA/PPO.

29. Natural and synthetic organic substances which constitute pure monomeric compounds or mixtures thereof, examples being mineral oils, animal or vegetable fats, oils and waxes, or oils, waxes and fats based on synthetic esters (e.g. phthalates, adipates, phosphates or trimellitates), and also blends of synthetic esters with mineral oils in any desired proportion by weight, as are employed, for example, as spin finishes, and aqueous emulsions thereof.

30. Aqueous emulsions of natural or synthetic rubbers, such as natural rubber latex or latices of carboxylated styrene-butadiene copolymers.

Other additives may be present in these polymers, e.g. antioxidants, light stabilizers (UV absorbers and/or HALS compounds), metal deactivators, peroxide degraders, polyamide stabilizers, basic co-stabilizers, nucleating agents, fillers, reinforcing agents, plasticizers, lubricant, emulsifiers, pigments and dyes, optical brighteners, flame retardants, antistats, blowing agents, etc.

These other additives may be added to the polymers prior to, together with or after addition of the mixture of the invention. Like the mixture of the invention, these additives may be metered in as a solid, in solution or melt, or else in the form of solid or liquid mixtures or masterbatches or concentrates, either batchwise or continuously.

The invention also encompasses all of the products obtainable by way of a shaping process from the abovementioned polymers, which comprise a mixture of the invention and at least one of the other additives mentioned.

The advantageous action of the mixture prepared according to the invention is illustrated by the examples below.

EXAMPLE 1

Preparation of a Mixture of the Invention from tris(2,4-di-tert-butylphenyl) phosphite (Component 1) and triphenylphosphane (Component 2)

Pulverulent mixtures of tris(2,4-di-tert-butylphenyl) phosphite (component 1) and triphenyl-phosphane (component 2) in each of the mixing ratios given below are melted and homogenized at a temperature of 190° C., with stirring, in a 250 ml flask with stirrer having a precision glass gland, under an inert gas ($N_2$). The resultant melt of the mixture is poured out into a porcelain dish and hardens on cooling. The size of each batch is 100 g.

TABLE 1

Amounts of components 1 and 2 in mixtures (1) of the invention.

| Mixture | Tris(2,4-di-tert-butyl-phenyl)phosphite [% by weight] | Triphenylphosphane [% by weight] |
|---|---|---|
| 1a | 100 | 0 |
| 1b | 70 | 30 |
| 1c | 50 | 50 |
| 1d | 30 | 70 |
| 1e | 0 | 100 |

EXAMPLE 2

Preparation of a Mixture of the Invention from bis(2,4-di-tert-butylphenyl) pentaerythrityl diphosphite (Component 1) and triphenylphosphane (Component 2)

Pulverulent mixtures of bis(2,4-di-tert-butylphenyl) pentaerythrityl diphosphite (component 1) and triphenylphosphane (component 2) in each of the mixing ratios given below are melted and homogenized at a temperature of 190° C., with stirring, in a 250 ml flask with stirrer having a precision glass gland, under an inert gas ($N_2$). The resultant melt of the mixture is poured out into a porcelain dish and hardens on cooling. The size of each batch is 100 g.

TABLE 2

Amounts of components 1 and 2 in mixtures (2) of the invention.

| Mixture | Bis(2,4-di-tert-butyl-phenyl) pentaerythrityl diphosphite [% by weight] | Triphenylphosphane [% by weight] |
|---|---|---|
| 2a | 100 | 0 |
| 2b | 70 | 30 |
| 2c | 50 | 50 |

TABLE 2-continued

Amounts of components 1 and 2 in mixtures (2) of the invention.

| Mixture | Bis(2,4-di-tert-butyl-phenyl) pentaerythrityl diphosphite [% by weight] | Triphenylphosphane [% by weight] |
|---|---|---|
| 2d | 30 | 70 |
| 2e | 0 | 100 |

EXAMPLE 3

Preparation of a Mixture of the Invention from tetrakis(2,4-di-tert-butylphenyl) biphenylyl-diphosphonite (Main Component in the Sandostab P-EPQ, Used, CLARIANT AG) (Component 1) and triphenylphosphane (Component 2)

Pulverulent mixtures of Sandostab P-EPQ (component 1) and triphenylphosphane (component 2) in each of the mixing ratios given below are melted and homogenized at a temperature of 190° C., with stirring, in a 250 ml flask with stirrer having a precision glass gland, under an inert gas ($N_2$). The resultant melt of the mixture is poured out into a porcelain dish and hardens on cooling. The size of each batch is 100 g.

TABLE 3

Amounts of components 1 and 2 in the mixtures (3) of the invention.

| Mixture | Sandostab P-EPQ [% by weight] | Triphenylphosphane [% by weight] |
|---|---|---|
| 3a | 100 | 0 |
| 3b | 70 | 30 |
| 3c | 50 | 50 |
| 3d | 30 | 70 |
| 3e | 0 | 100 |

EXAMPLE 4

To prepare a polymer (4a) stabilized according to the invention,

| | |
|---|---|
| 100 | parts of polypropylene (eltex P HL 001PF, Solvay) |
| 0.05 | parts of Irganox 1010 |
| 0.10 | parts of calcium stearate and |
| 0.04 | parts of the mixture (1a) of the invention | in powder form are mixed in a mixer and then homogenized by extrusion under mild conditions in a single-screw extruder (Collin, 210° C., 80/min, compr. 1:3, die 4 mm), and the resultant polymer extrudate is pelletized. Stabilized polymers (4b) to (4e) are prepared similarly from mixtures (1b) to (1e).

To study melt flow stabilization and color stabilization, these stabilized polymers (4a) to (4e) are subjected to 5-fold extrusion at 270° C. in a single-screw extruder (Göttfert Extrusiometer, 50/min, compr. 1:3, die 2 mm). Melt flow index (MFI) to ASTM 1238 cond. L (230° C./2.16 kg) and Yellowness Index (YI) to DIN 6167 are determined after the fifth pass. The results obtained are given in the table below.

TABLE 4

Results for melt flow stabilization and color stabilization of PP using 0.04 parts of mixtures (1a) to (1e)

| Stabilized Polymers | Triphenyl-phosphane [% by weight] | 5th Pass MFI [g/10 min] | YI |
|---|---|---|---|
| 4a | 0 | 13.48 | 10.8 |
| 4b | 30 | 9.99 | 9.6 |
| 4c | 50 | 6.49 | 10.4 |
| 4d | 70 | 4.63 | 10.3 |
| 4e | 100 | 4.80 | 11.8 |

EXAMPLE 5

Stabilized polymers (5a) to (5e) are prepared in a manner similar to that in example 4 from mixtures (1a) to (1e) at a concentration of 0.07 part of the mixtures of the invention, and are tested correspondingly. The results are given in the table below.

TABLE 5

Results for melt flow stabilization and color stabilization of PP using 0.07 part of mixtures (1a) to (1e)

| Stabilized Polymers | Triphenyl-phosphane [% by weight] | 5th Pass MFI [g/10 min] | YI |
|---|---|---|---|
| 5a | 0 | 10.85 | 12.8 |
| 5b | 30 | 5.60 | 10.2 |
| 5c | 50 | 4.51 | 10.2 |
| 5d | 70 | 4.43 | 8.6 |
| 5e | 100 | 4.24 | 8.3 |

EXAMPLE 6

Stabilized polymers (6a) to (6e) are prepared in a manner similar to that in example 4 from mixtures (2a) to (2e) at a concentration of 0.04 part of the mixtures of the invention, and are tested correspondingly. The results are given in the table below.

TABLE 6

Results for melt flow stabilization and color stabilization of PP using 0.04 part of mixtures (2a) to (2e)

| Stabilized Polymers | Triphenyl-phosphane [% by weight] | 5th Pass MFI [g/10 min] | YI |
|---|---|---|---|
| 6a | 0 | 5.34 | 8.5 |
| 6b | 30 | 4.55 | 5.3 |
| 6c | 50 | 4.19 | 5.5 |
| 6d | 70 | 4.75 | 9.9 |
| 6e | 100 | 4.80 | 11.8 |

EXAMPLE 7

Stabilized polymers (7a) to (7e) are prepared in a manner similar to that in example 4 from mixtures (2a) to (2e) at a concentration of 0.07 part of the mixtures of the invention, and are tested correspondingly. The results are given in the table below.

TABLE 7

Results for melt flow stabilization and color stabilization of PP using 0.07 part of mixtures (2a) to (2e)

| Stabilized Polymers | Triphenyl-phosphane [% by weight] | 5th Pass MFI [g/10 min] | YI |
|---|---|---|---|
| 7a | 0 | 4.27 | 6.2 |
| 7b | 30 | 4.09 | 4.3 |
| 7c | 50 | 3.58 | 4.5 |
| 7d | 70 | 3.78 | 5.5 |
| 7e | 100 | 4.24 | 8.3 |

EXAMPLE 8

Stabilized polymers (8a) to (8e) are prepared in a manner similar to that in example 4 from mixtures (3a) to (3e) at a concentration of 0.04 part of the mixtures of the invention, and are tested correspondingly. The results are given in the table below.

TABLE 8

Results for melt flow stabilization and color stabilization of PP using 0.04 part of mixtures (3a) to (3e)

| Stabilized Polymers | Triphenyl-phosphane [% by weight] | 5th Pass MFI [g/10 min] | YI |
|---|---|---|---|
| 8a | 0 | 8.28 | 8.0 |
| 8b | 30 | 6.30 | 8.4 |
| 8c | 50 | 5.11 | 7.9 |
| 8d | 70 | 4.70 | 9.4 |
| 8e | 100 | 4.80 | 11.8 |

EXAMPLE 9

Stabilized polymers (9a) to (9e) are prepared in a manner similar to that in example 4 from mixtures (3a) to (3e) at a concentration of 0.07 part of the mixtures of the invention, and are tested correspondingly. The results are given in the table below.

TABLE 9

Results for melt flow stabilization and color stabilization of PP using 0.07 part of mixtures (3a) to (3e)

| Stabilized Polymers | Triphenyl-phosphane [% by weight] | 5th Pass MFI [g/10 min] | YI |
|---|---|---|---|
| 9a | 0 | 5.23 | 7.5 |
| 9b | 30 | 4.43 | 5.9 |
| 9c | 50 | 4.04 | 5.8 |
| 9d | 70 | 4.21 | 6.5 |
| 9e | 100 | 4.24 | 8.3 |

As clearly shown by the results of examples (4) to (9), all of these mixtures (1) to (3) of the invention have markedly synergistic behavior for use as stabilizers, and this is particularly readily discernible if the results are presented graphically (MFI and, respectively, YI against concentration of a component in the mixture). In all cases, the curve for the property measured (MFI value or YI value) lies well below the theoretically expected straight line connecting the individual components, i.e. the property is much better than expected in the mixture.

EXAMPLE 10

Preparation of a Mixture of the Invention from tris(2,4-di-tert-butylphenyl) phosphite (Component 1) and bis(diphenylphosphino)-2,2-dimethylpropane (Component 2)

Pulverulent mixtures of tris(2,4-di-tert-butylphenyl) phosphite (component 1) and bis(diphenylphosphino)-2,2-dimethylpropane (component 2) in each of the mixing ratios given below are melted and homogenized at a temperature of 190° C., with stirring, in a 250 ml flask with a stirrer with precision glass gland, under an inert gas ($N_2$). The resultant melt of the mixture is poured out into a porcelain dish, and hardens on cooling. The size of each batch is 50 g.

TABLE 10

Amounts of components 1 and 2 in mixtures (10) of the invention.

| Mixture | Tris(2,4-di-tert-butyl-phenyl)phosphite [% by weight] | Bis(diphenylphosphino)-2,2-dimethylpropane [% by weight] |
|---|---|---|
| 10a | 100 | 0 |
| 10b | 70 | 30 |
| 10c | 50 | 50 |
| 10d | 30 | 70 |
| 10e | 0 | 100 |

EXAMPLE 11

Preparation of a Mixture of the Invention from tris(2,4-di-tert-butylphenyl) phosphite (Component 1) and 1,1,1-tris(diphenylphosphinomethyl)propane (Component 2)

Pulverulent mixtures of tris(2,4-di-tert-butylphenyl)phosphite (component 1) and 1,1,1-bis(diphenylphoshinomethyl)propane (component 2) in each of the mixing ratios given below are melted and homogenized at a temperature of 190° C., with stirring, in a 250 ml flask with a stirrer with precision glass gland, under an inert gas ($N_2$). The resultant melt of the mixture is poured out into a porcelain dish, and hardens on cooling. The size of each batch is 50 g.

TABLE 11

Amounts of components 1 and 2 in mixtures (11) of the invention.

| Mixture | Tris(2,4-di-tert-butyl-phenyl)phosphite [% by weight] | 1,1,1-Tris-(diphenylphosphino-methyl)propane [% by weight] |
|---|---|---|
| 11a | 100 | 0 |
| 11b | 70 | 30 |
| 11c | 50 | 50 |
| 11d | 30 | 70 |
| 11e | 0 | 100 |

EXAMPLE 12

To prepare a polymer (12a) stabilized according to the invention,

| | |
|---|---|
| 100.00 | parts of Linear low-density polyethylene (LLDPE) |
| 0.05 | part of Hostanox O 16 |
| 0.10 | part of Calcium stearate and |
| 0.04 | part of the mixture (10a) of the invention | are mixed in powder form in a mixer and then homogenized by extrusion under mild conditions in a single-screw extruder (Haendle, KPS 25, 210° C., 80/min, compr. 1:3, die 4 mm), and the resultant polymer extrudate is pelletized. Stabilized polymers (12b) to (12e) are prepared similarly from mixtures (10b) to (10e).

To study melt flow stabilization and color stabilization, these stabilized polymers (12a) to (12e) are subjected to 5-fold extrusion at 240° C. in a single-screw extruder (Göttfert Extrusiometer, 70/min, compr. 1:3, die 4 mm). Melt flow index (MFI) to ASTM 1238 cond. L (190° C./2.16 kg) and Yellowness Index (YI) to DIN 6167 are determined after the fifth pass. The results obtained are given in the table below.

TABLE 12

Results for melt flow stabilization and color stabilization LLDPE using 0.04 part of mixtures (10a) to (10e)

| Stabilized Polymers | Bis(diphenyl-phosphino)-2,2-dimethylpropane [% by weight] | 5th Pass MFI [g/10 min] | YI |
|---|---|---|---|
| 12a | 0 | 1.35 | 10.51 |
| 12b | 30 | 1.60 | 9.88 |
| 12c | 50 | 1.83 | 9.13 |
| 12d | 70 | 2.08 | 8.16 |
| 12e | 100 | 2.19 | 8.41 |

EXAMPLE 13

Stabilized polymers (13a) to (13e) are prepared in a manner similar to that in example 12 from mixtures (10a) to (10e) at a concentration of 0.07 part of the mixtures of the invention, and are tested correspondingly. The results are given in the table below.

TABLE 13

Results for melt flow stabilization and color stabilization LLDPE using 0.07 part of mixtures (10a) to (10e)

| Stabilized Polymers | Bis(diphenyl-phosphino)-2,2-dimethylpropane [% by weight] | 5th Pass MFI [g/10 min] | YI |
|---|---|---|---|
| 13a | 0 | 1.51 | 9.58 |
| 13b | 30 | 1.87 | 7.00 |
| 13c | 50 | 2.11 | 7.34 |
| 13d | 70 | 2.25 | 5.69 |
| 13e | 100 | 2.28 | 4.25 |

EXAMPLE 14

Stabilized polymers (14a) to (14e) are prepared in a manner similar to that in example 12 from mixtures (11a) to (11e) at a concentration of 0.04 part of the mixtures of the invention, and are tested correspondingly. The results are given in the table below.

TABLE 14

Results for melt flow stabilization and color stabilization LLDPE using 0.04 part of mixtures (11a) to (11e)

| Stabilized Polymers | 1,1,1-Tris(diphenyl-phosphinomethyl)-propane [% by weight] | 5th Pass MFI [g/10 min] | YI |
|---|---|---|---|
| 14a | 0 | 1.35 | 10.51 |
| 14b | 30 | 1.65 | 6.20 |
| 14c | 50 | 1.85 | 5.00 |
| 14d | 70 | 1.99 | 5.41 |
| 14e | 100 | 2.13 | 9.12 |

EXAMPLE 15

Stabilized polymers (15a) to (15e) are prepared in a manner similar to that in example 12 from mixtures (11a) to (11e) at a concentration of 0.07 part of the mixtures of the invention, and are tested correspondingly. The results are given in the table below.

TABLE 15

Results for melt flow stabilization and color stabilization LLDPE using 0.07 part of mixtures (15a) to (15e)

| Stabilized Polymers | 1,1,1-Tris(diphenyl-phosphinomethyl)-propane [% by weight] | 5th Pass MFI [g/10 min] | YI |
|---|---|---|---|
| 15a | 0 | 1.51 | 9.58 |
| 15b | 30 | 1.96 | 5.49 |
| 15c | 50 | 2.07 | 5.40 |
| 15d | 70 | 2.21 | 3.67 |
| 15e | 100 | 2.27 | 4.40 |

EXAMPLE 16

Stabilized polymers (16a) to (16e) are prepared in a manner similar to that in example 12 from mixtures (1a) to (1e) at a concentration of 0.04 part of the mixtures of the invention, and are tested correspondingly. The results are given in the table below.

TABLE 16

Results for melt flow stabilization and color stabilization LLDPE using 0.04 part of mixtures (1a) to (1e)

| Stabilized Polymers | Triphenyl-phosphane [% by weight] | 5th Pass MFI [g/10 min] | YI |
|---|---|---|---|
| 16a | 0 | 1.35 | 10.51 |
| 16b | 30 | 1.71 | 7.63 |
| 16c | 50 | 1.95 | 6.83 |
| 16d | 70 | 1.96 | 8.64 |
| 16e | 100 | 2.15 | 11.55 |

EXAMPLE 17

Stabilized polymers (17a) to (17e) are prepared in a manner similar to that in example 12 from mixtures (1a) to (1e) at a concentration of 0.07 part of the mixtures of the invention, and are tested correspondingly. The results are given in the table below.

TABLE 17

Results for melt flow stabilization and color stabilization LLDPE using 0.07 part of mixtures (1a) to (1e)

| Stabilized Polymers | Triphenylphosphane [% by weight] | 5th Pass MFI [g/10 min] |
|---|---|---|
| 17a | 0 | 1.51 |
| 17b | 30 | 2.02 |
| 17c | 50 | 2.04 |
| 17d | 70 | 2.16 |
| 17e | 100 | 2.30 |

EXAMPLE 18

To prepare a polymer (18a) stabilized according to the invention,

| | |
|---|---|
| 100.00 | parts of High-density polyethylene (HDPE) |
| 0.05 | parts of Hostanox O 10 |
| 0.10 | parts of Calcium stearate and |
| 0.04 | parts of the mixture (10a) of the invention | are mixed in powder form in a mixer and then homogenized by extrusion under mild conditions in a single-screw extruder (Haendle, KPS 25, 210° C., 80/min, compr. 1:3, die 4 mm), and the resultant polymer extrudate is pelletized. Stabilized polymers (18b) to (18e) are prepared similarly from mixtures (10b) to (10e).

To study melt flow stabilization and color stabilization, these stabilized polymers (18a) to (18e) are subjected to 5-fold extrusion at 240° C. in a single-screw extruder (Göttfert Extrusiometer, 70/min, compr. 1:3, die 3 mm). Melt flow index (MFI) to ASTM 1238 cond. L (190° C./2.16 kg) and Yellowness Index (YI) to DIN 6167 are determined after the fifth pass. The results obtained are given in the table below.

TABLE 18

Results for melt flow stabilization and color stabilization HDPE using 0.04 part of mixtures (10a) to (10e)

| Stabilized Polymers | Bis(diphenyl-phosphino)-2,2-dimethylpropane [% by weight] | 5th Pass MFI [g/10 min] | YI |
|---|---|---|---|
| 18a | 0 | 6.15 | 2.92 |
| 18b | 30 | 7.00 | 1.06 |
| 18c | 50 | 6.92 | −0.95 |
| 18d | 70 | 6.87 | −1.19 |
| 18e | 100 | 6.84 | −1.00 |

EXAMPLE 19

Stabilized polymers (19a) to (19e) are prepared in a manner similar to that in example 18 from mixtures (10a) to (10e) at a concentration of 0.07 part of the mixtures of the invention, and are tested correspondingly. The results are given in the table below.

TABLE 19

Results for melt flow stabilization and color stabilization
HDPE using 0.07 part of mixtures (10a) to (10e)

| Stabilized Polymers | Bis(diphenyl-phosphino)-2, 2-dimethylpropane [% by weight] | 5th Pass MFI [g/10 min] | YI |
|---|---|---|---|
| 19a | 0 | 6.46 | 2.73 |
| 19b | 30 | 6.64 | −1.98 |
| 19c | 50 | 6.84 | −1.40 |
| 19d | 70 | 6.61 | −1.85 |
| 19e | 100 | 6.70 | −1.08 |

EXAMPLE 20

Stabilized polymers (20a) to (20e) are prepared in a manner similar to that in example 18 from mixtures (11a) to (11e) at a concentration of 0.04 part of the mixtures of the invention, and are tested correspondingly. The results are given in the table below.

TABLE 20

Results for melt flow stabilization and color stabilization
HDPE using 0.04 part of mixtures (11a) to (11e)

| Stabilized Polymers | 1,1,1-Tris(diphenyl-phosphinomethyl)-propane [% by weight] | 5th Pass MFI [g/10 min] | YI |
|---|---|---|---|
| 20a | 0 | 6.15 | 2.92 |
| 20b | 30 | 6.89 | 2.67 |
| 20c | 50 | 6.84 | 2.10 |
| 20d | 70 | 6.61 | −0.48 |
| 20e | 100 | 6.82 | −1.36 |

EXAMPLE 21

Stabilized polymers (21a) to (21e) are prepared in a manner similar to that in example 18 from mixtures (11a) to (11e) at a concentration of 0.07 part of the mixtures of the invention, and are tested correspondingly. The results are given in the table below.

TABLE 21

Results for melt flow stabilization and color stabilization
HDPE using 0.07 part of mixtures (11a) to (11e)

| Stabilized Polymers | 1,1,1-Tris(diphenyl-phosphinomethyl)-propane [% by weight] | 5th Pass MFI [g/10 min] | YI |
|---|---|---|---|
| 21a | 0 | 6.46 | 2.73 |
| 21b | 30 | 6.90 | 1.44 |
| 21c | 50 | 6.87 | 0.19 |
| 21d | 70 | 6.92 | −0.48 |
| 21e | 100 | 6.84 | −0.25 |

EXAMPLE 22

Stabilized polymers (22a) to (22e) are prepared in a manner similar to that in example 18 from mixtures (1a) to (1e) at a concentration of 0.04 part of the mixtures of the invention, and are tested correspondingly. The results are given in the table below.

TABLE 22

Results for melt flow stabilization and color stabilization
HDPE using 0.04 part of mixtures (1a) to (1e)

| Stabilized Polymers | Triphenyl-phosphane [% by weight] | 5th Pass MFI [g/10 min] | YI |
|---|---|---|---|
| 22a | 0 | 6.15 | 2.92 |
| 22b | 30 | 6.89 | 0.96 |
| 22c | 50 | 6.74 | 1.69 |
| 22d | 70 | 7.00 | −0.92 |
| 22e | 100 | 6.59 | 0.04 |

EXAMPLE 23

Stabilized polymers (23a) to (23e) are prepared in a manner similar to that in example 18 from mixtures (1a) to (1e) at a concentration of 0.07 part of the mixtures of the invention, and are tested correspondingly. The results are given in the table below.

TABLE 23

Results for melt flow stabilization and color stabilization
HDPE using 0.07 part of mixtures (1a) to (1e)

| Stabilized Polymers | Triphenyl-phosphane [% by weight] | 5th Pass MFI [g/10 min] | YI |
|---|---|---|---|
| 23a | 0 | 6.46 | 2.73 |
| 23b | 30 | 6.88 | −0.35 |
| 23c | 50 | 6.91 | −0.64 |
| 23d | 70 | 6.86 | −1.26 |
| 23e | 100 | 6.85 | −0.04 |

As clearly shown by the results of these examples, these mixtures (1) to (3), and also (10) and (11), of the invention have markedly synergistic behavior for use as stabilizers, and this is particularly readily discernible if the results are presented graphically (MFI and, respectively, YI against concentration of a component in the mixture). In all cases, the curve for the property measured (MFI value or YI value) lies on the side of better stabilization and therefore below (MFI of PP and all of the YI) or above (MFI of LLDPE and HDPE) the theoretically to be expected straight line connecting the individual components, i.e. the property is better in the mixture than would be expected from linear interpolation.

The invention claimed is:
1. A stabilized polymer comprising
   at least one polymer, wherein the at least one polymer is selected from the group consisting of polyolefins and polyesters; and
   at least one stabilizer mixture, wherein the at least one stabilizer mixture comprises
   a) at least one compound selected from the group of compounds of the formulae (I) to (IX) and (XI) to (XV)

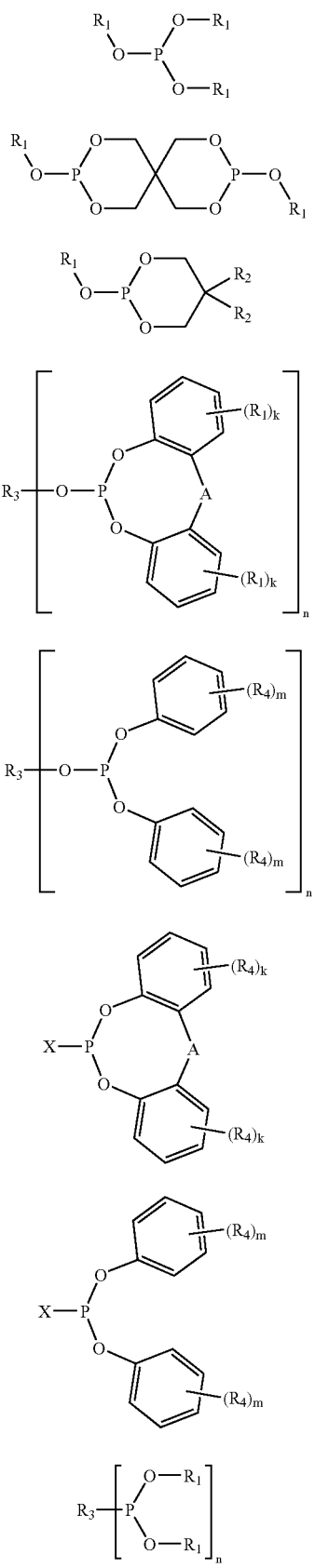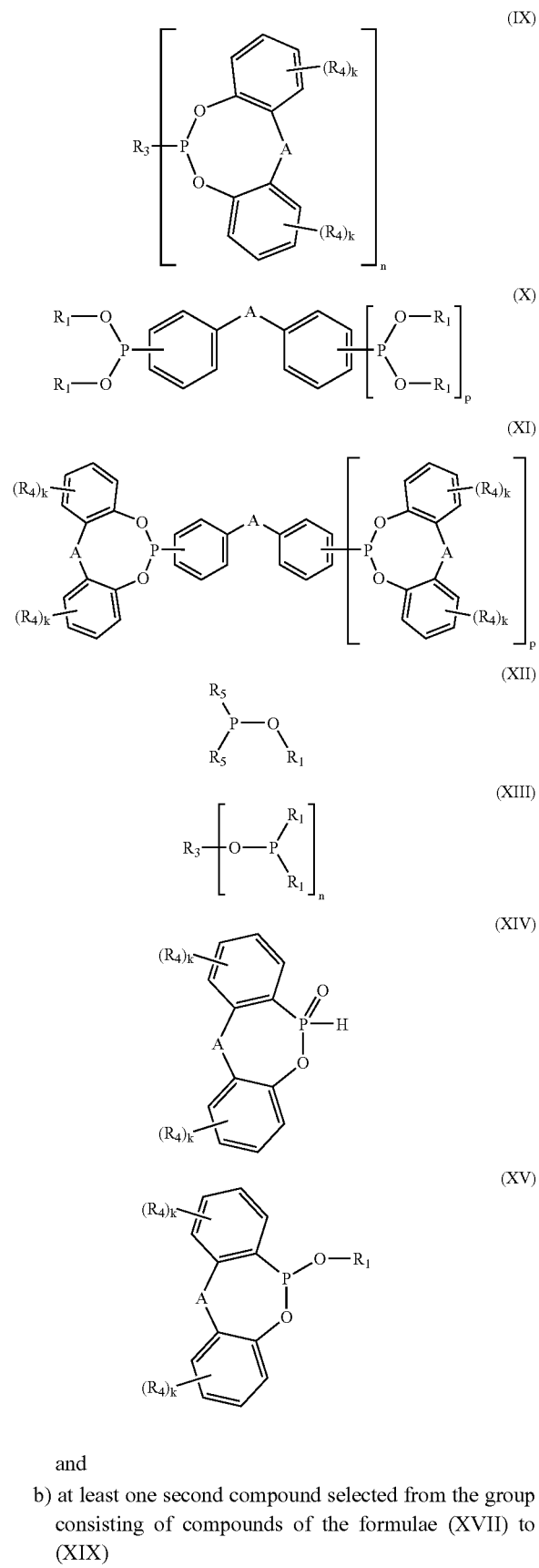
and
b) at least one second compound selected from the group consisting of compounds of the formulae (XVII) to (XIX)

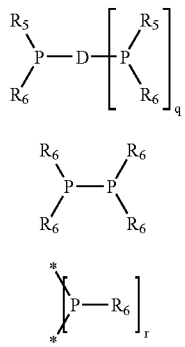

(XVII)

(XVIII)

(XIX)

where, independently of one another, each group $R_1$ is $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

$R_2$ is H, $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

$R_3$ is an n-valent group $C_1$–$C_{30}$-alkylene linear or branched, optionally containing heteroatoms N, O, P, or S, $C_1$–$C_{30}$-alkylidene optionally containing heteroatoms N, O, P, or S, $C_5$–$C_{12}$-cycloalkylene or $C_6$–$C_{24}$-arylene optionally substituted with $C_1$–$C_{18}$-alkyl linear or branched, $C_5$–$C_{12}$-cycloalkyl or $C_1$–$C_{18}$ alkoxy, $R_4$ is $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

$R_5$ is $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

$R_6$ $C_1$–$C_{24}$-alkyl linear or branched, optionally containing heteroatoms N, O, P, or, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

A is a direct bond, $C_1$–$C_{30}$-alkylidene optionally containing heteroatoms N, O, P, or S, >NH, >NR$_1$, —S—, >S(O), >S(O)$_2$, —O—;

D is a q-valent group $C_1$–$C_{30}$-alkylene linear, branched, optionally containing heteroatoms N, O, P, or S, $C_1$–$C_{30}$-alkylidene optionally containing heteroatoms N, O, P, or S, $C_5$–$C_{12}$-cycloalkylene optionally containing heteroatoms N, O, P, or S or $C_6$–$C_{24}$-arylene optionally substituted with $C_1$–$C_{18}$-alkyl linear or branched, $C_5$–$C_{12}$-cycloalkyl $C_1$–$C_{18}$ alkoxy, —O—, —S—;

X is Cl, Br, F, OH including the resultant tautomeric form >P(O)H;

k is from 0 to 4;

n is from 1 to 4;

m is from 0 to 5;

p is 0 or 1;

q is from 1 to 5;

r is from 3 to 6, where the groups P—$R_6$ in formula (XIX) are a constituent of a phosphacycle, indicated by * on the bonds emanating from P.

2. A stabilized polymer according to claim 1, where, independently of one another $R_1$ is $C_6$–$C_{12}$-cycloalkyl optionally containing heteroatoms N, O, P, or S, $C_2$–$C_{24}$-alkylaryl, $C_6$–$C_{24}$-aryl or heteroaryl, $C_6$–$C_{24}$-aryl or heteroaryl substituted with the groups $C_1$–$C_{12}$-alkyl linear or branched, $C_5$–$C_8$-cycloalkyl or $C_1$–$C_{12}$-alkoxy;

$R_2$ is H, $C_1$–$C_{12}$-alkyl linear or branched, optionally containing heteroatoms N, O, P, or S, $C_5$–$C_{12}$-cycloalkyl optionally containing heteroatoms N, O, P, or S, $C_1$–$C_{18}$-alkylaryl, $C_6$–$C_{24}$-aryl or heteroaryl, $C_6$–$C_{24}$-aryl or heteroaryl substituted with the groups $C_1$–$C_{12}$-alkyl linear or branched, $C_5$–$C_8$-cycloalkyl or $C_1$–$C_{12}$-alkoxy;

$R_3$ is an n-valent group $C_1$–$C_{14}$-alkylene linear or branched, optionally containing heteroatoms N, O, P, or S, $C_1$–$C_{18}$-alkylidene optionally containing heteroatoms N, O, P, or S, $C_5$–$C_8$-cycloalkylene or $C_6$–$C_{24}$-arylene optionally substituted with $C_1$–$C_{18}$-alkyl linear or branched, $C_5$–$C_8$-cycloalkyl or $C_1$–$C_{12}$ alkoxy $R_4$ is $C_1$–$C_{18}$-alkyl linear or branched, optionally containing heteroatoms N, O, P, or S, $C_5$–$C_{12}$-cycloalkyl optionally containing heteroatoms N, O, P, or S, $C_1$–$C_{24}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_8$-cycloalkyl or $C_1$–$C_{12}$-alkoxy;

$R_5$ is $C_8$–$C_{24}$-alkyl linear or branched, optionally containing heteroatoms N, O, P, or S, $C_5$–$C_{12}$-cycloalkyl optionally containing heteroatoms N, O, P, or S, $C_1$–$C_{18}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_8$-cycloalkyl or $C_1$–$C_{18}$-alkoxy;

$R_6$ $C_5$–$C_{18}$-alkyl linear or branched, optionally containing heteroatoms N, O, P, or S, $C_5$–$C_{12}$-cycloalkyl optionally containing heteroatoms N, O, P, or S, $C_1$–$C_{18}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_8$-cycloalkyl or $C_1$–$C_{12}$-alkoxy;

A is a direct bond, $C_1$–$C_{18}$-alkylidene optionally containing heteroatoms N, O, P, or S, >NH, —S—, —O—;

D is q-valent group $C_1$–$C_{24}$-alkylene linear, branched, optionally containing heteroatoms N, O, P, or S, $C_1$–$C_{24}$-alkylidene optionally containing heteroatoms N, O, P, or S, $C_5$–$C_8$-cycloalkylene optionally containing heteroatoms N, O, P, or S or $C_6$–$C_{24}$-arylene optionally substituted with $C_1$–$C_{18}$-alkyl linear or branched, $C_5$–$C_8$-cycloalkyl or $C_1$–$C_{12}$-alkoxy;

X is F or OH including the resultant tautomeric form >P(O)H;

k is from 0 to 3;

n is from 1 to 4;

m is from 0 to 3;
p is 0 or 1;
q is from 1 to 4;
r is 4 or 5, where the groups P—$R_6$ in the formula (XIX) are a constituent of a phosphacycle, indicated by * on the bonds emanating from P.

3. A stabilized polymer according to claim 1, where, independently of one another,
$R_1$ is $C_6$–$C_{24}$-aryl or heteroaryl, or $C_6$–$C_{24}$-aryl or heteroaryl substituted with the groups $C_1$–$C_{12}$-alkyl linear or branched, $C_5$–$C_8$-cycloalkyl or $C_1$–$C_{12}$-alkoxy;
$R_2$ is $C_1$–$C_8$-alkyl linear or branched, $C_5$–$C_8$-cycloalkyl, $C_1$–$C_{18}$-alkylaryl, $C_6$–$C_{12}$-aryl heteroaryl, $C_6$–$C_{12}$-aryl or heteroaryl substituted with the groups $C_1$–$C_{12}$-alkyl linear or branched, $C_6$–$C_8$-cycloalkyl or $C_1$–$C_8$-alkoxy;
$R_3$ is an n-valent group $C_1$–$C_{12}$-alkylene linear or branched optionally containing heteroatoms N or P, $C_1$–$C_{12}$-alkylidene optionally containing heteroatoms N or P, $C_6$–$C_8$-cycloalkylene, or $C_6$–$C_{12}$-arylene optionally substituted with $C_1$–$C_{12}$-alkyl linear or branched, $C_6$–$C_8$-cycloalkyl or $C_1$–$C_8$-alkoxy;
$R_4$ is $C_1$–$C_8$-alkyl linear or branched, $C_5$–$C_8$-cycloalkyl, $C_1$–$C_{18}$-alkylaryl, $C_6$–$C_{12}$-aryl or heteroaryl, $C_6$–$C_{12}$-aryl or heteroaryl substituted with the groups $C_1$–$C_{12}$-alkyl linear or branched, $C_6$–$C_8$-cycloalkyl or $C_1$–$C_8$-alkoxy;
$R_5$ is $C_{12}$–$C_{18}$-alkyl linear or branched, optionally containing heteroatoms N, O, P, or S, $C_6$–$C_8$-cycloalkyl, $C_1$–$C_{12}$-alkylaryl, $C_6$–$C_{18}$-aryl or heteroaryl, $C_6$–$C_{18}$-aryl or heteroaryl substituted with the groups $C_1$–$C_8$-alkyl linear or branched, $C_6$–$C_8$-cycloalkyl or $C_1$–$C_8$-alkoxy;
$R_6$ is $C_5$–$C_{12}$-alkyl linear or branched, $C_5$–$C_8$-cycloalkyl, $C_1$–$C_{12}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_8$-cycloalkyl or $C_1$–$C_{12}$-alkoxy;
A is a direct bond, $C_1$–$C_{18}$-alkylidene optionally containing heteroatoms N, O, P, or S, >NH, —S—, or —O—;
D is q-valent group $C_1$–$C_{24}$-alkylene linear, branched, optionally containing heteroatoms N, O, P, or S, $C_1$–$C_{24}$-alkylidene optionally containing heteroatoms N, O, P, or S, $C_5$–$C_8$-cycloalkylene optionally containing heteroatoms N, O, P, or S, or $C_6$–$C_{24}$-arylene optionally substituted with $C_1$–$C_{18}$-alkyl linear or branched, $C_5$–$C_8$-cycloalkyl or $C_1$–$C_{12}$-alkoxy;
X is F or OH including the resultant tautomeric form >P(O)H;
k is from 0 to 3;
n is from 1 to 4;
m is from 0 to 3;
p is 0 or 1;
q is from 1 to 4;
r is 4 or 5, where the groups P—$R_6$ in the formula (XIX) are a constituent of a phosphacycle indicated by * on the bonds emanating from P.

4. A stabilized polymer according to claim 1, where the proportion by weight of the at least one first compound is from 1 to 99% by weight, and the proportion by weight of the at least one second compound is from 99 to 1% by weight.

5. A process for stabilizing a polymer with respect to thermooxidative degradation, comprising the step of adding a stabilizing mixture to a polymer, wherein the polymer is selected from the group consisting of polyolefins and polyesters, wherein the stabilizing mixture is added in an amount of from 0.001 to 5% by weight based on the polymer and wherein the stabilizing mixture comprises
a) at least one first compound selected from the group of compounds of the formulae (I) to (IX) and (XI) to (XV)

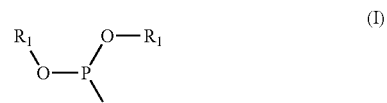
(I)

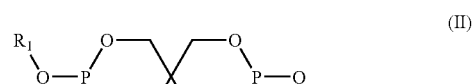
(II)

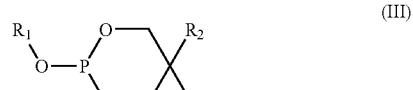
(III)

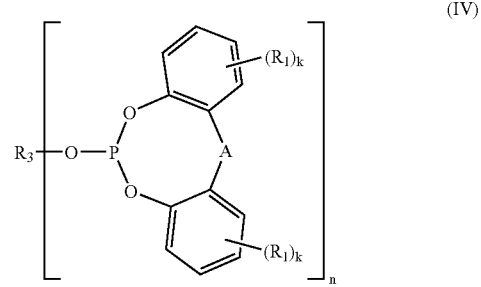
(IV)

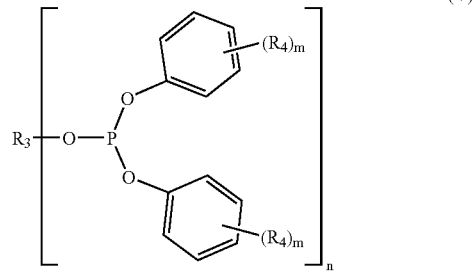
(V)

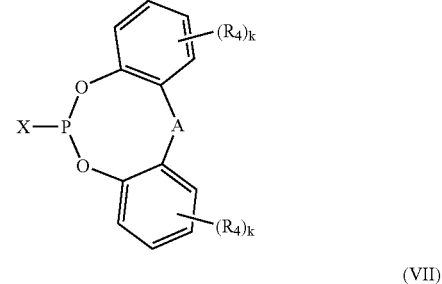
(VI)

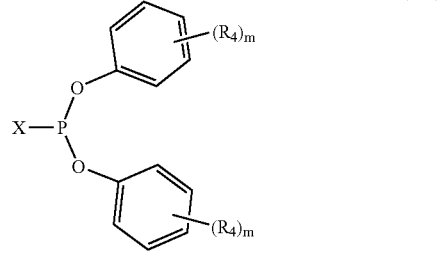
(VII)

-continued

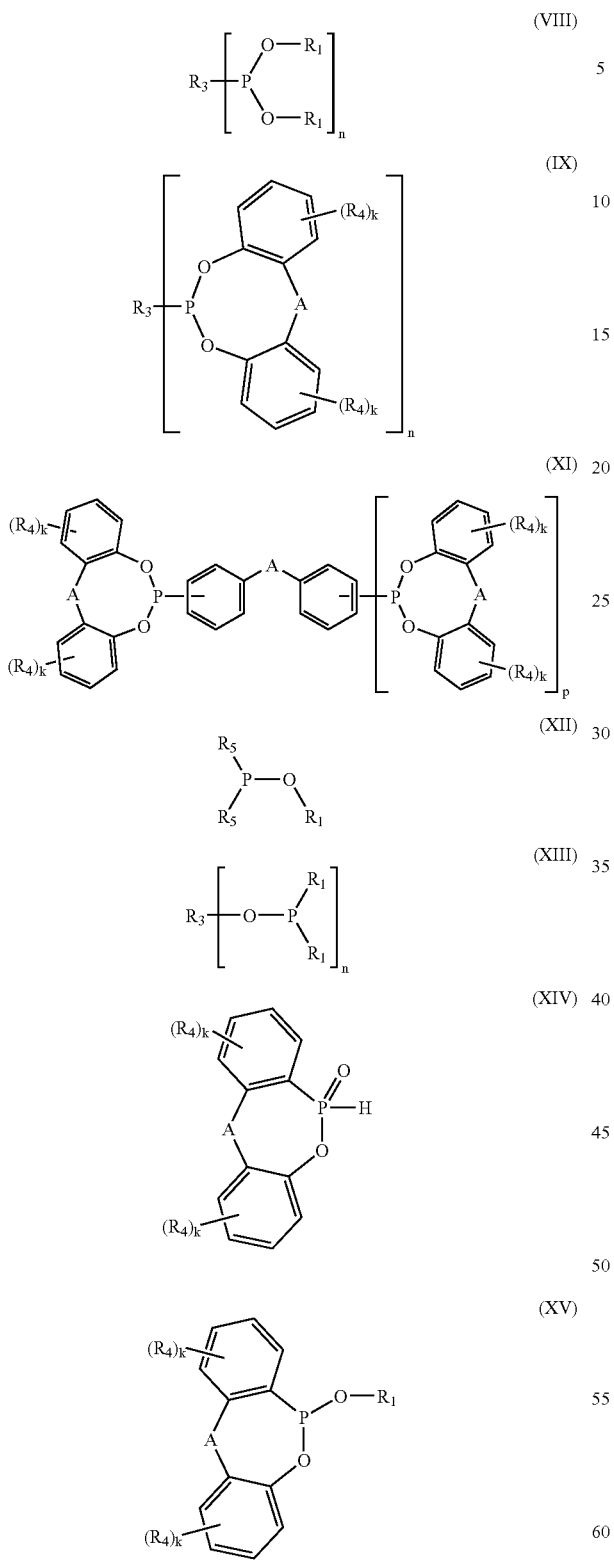

(VIII)

(IX)

(XI)

(XII)

(XIII)

(XIV)

(XV)

and b) at least one second compound selected from the group consisting of compounds of the formulae (XVII) to (XIX)

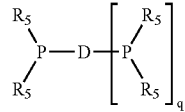

(XVII)

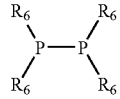

(XVIII)

where, independently of one another, each group $R_1$ is $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

$R_2$ is H, $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

$R_3$ is an n-valent group $C_1$–$C_{30}$-alkylene linear or branched, optionally containing heteroatoms N, O, P, or S, $C_1$–$C_{30}$-alkylidene optionally containing heteroatoms N, O, P, or S, $C_5$–$C_{12}$-cycloalkylene or $C_6$–$C_{24}$-arylene optionally substituted with $C_1$–$C_{18}$-alkyl linear or branched, $C_5$–$C_{12}$-cycloalkyl or $C_1$–$C_{18}$ alkoxy;

$R_4$ is $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

$R_5$ is $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

$R_6$ $C_1$–$C_{24}$-alkyl linear or branched, optionally containing heteroatoms N, O, P, or, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

A is a direct bond, $C_1$–$C_{30}$-alkylidene optionally containing heteroatoms N, O, P, or S, >NH, >NR$_1$, —S—, >S(O), >S(O)$_2$, —O—;

D is a q-valent group $C_1$–$C_{30}$-alkylene linear, branched, optionally containing heteroatoms N, O, P, or S, $C_1$–$C_{30}$-alkylidene optionally containing heteroatoms N, O, P, or S, $C_5$–$C_{12}$-cycloalkylene optionally containing heteroatoms N, O, P, or S or $C_6$–$C_{24}$-arylene optionally substituted with $C_1$–$C_{18}$-alkyl linear or branched, $C_5$–$C_{12}$-cycloalkyl $C_1$–$C_{18}$ alkoxy, —O—, —S—;

X is Cl, Br, F, OH including the resultant tautomeric form >P(O)H;
k is from 0 to 4;
n is from 1 to 4;
m is from 0 to 5;
p is 0 or 1;
q is from 1 to 5;
r is from 3 to 6, where the groups P—R$_6$ in formula (XIX) are a constituent of a phosphacycle, indicated by * on the bonds emanating from P.

6. A stabilized polymer comprising at least one polymer and at least one stabilizer mixture, wherein the at least one stabilizer mixture comprises:
a) at least one first compound selected from the group of compounds of the formulae (I) to (IX) and (XI) to (XV)

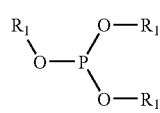
(I)

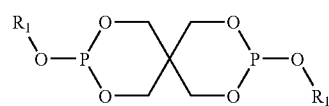
(II)

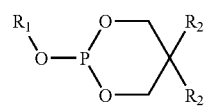
(III)

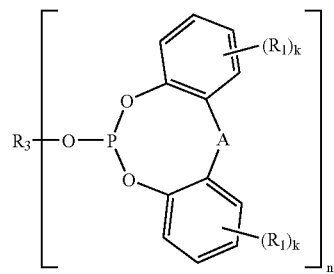
(IV)

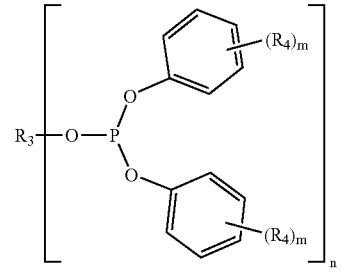
(V)

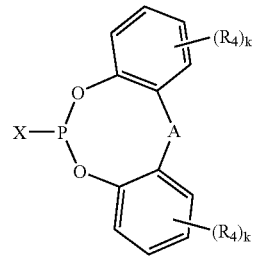
(VI)

-continued

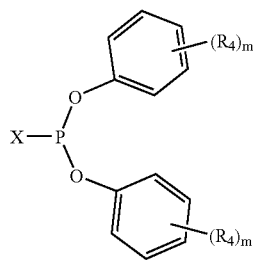
(VII)

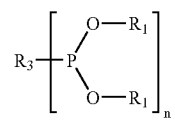
(VIII)

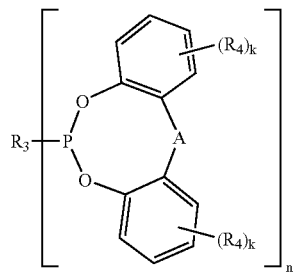
(IX)

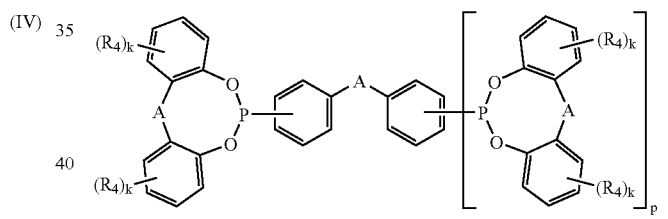
(XI)

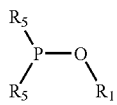
(XII)

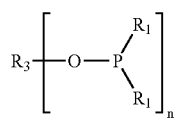
(XIII)

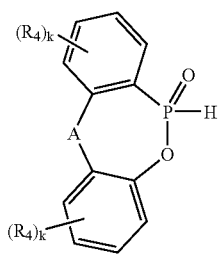
(XIV)

-continued

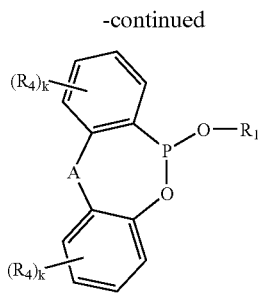
(XV)

and b) at least one second compound selected from the group consisting of compounds of the formulae (XVII) to (XIX)

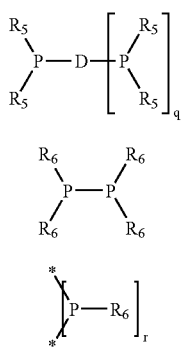
(XVII)

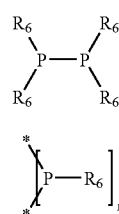
(XVIII)

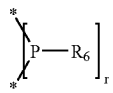
(XIX)

where, independently of one another, each group $R_1$ is $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

$R_2$ is H, $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

$R_3$ is an n-valent group $C_1$–$C_{30}$-alkylene linear or branched, optionally containing heteroatoms N, O, P, or S, $C_1$–$C_{30}$-alkylidene optionally containing heteroatoms N, O, P, or S, $C_5$–$C_{12}$-cycloalkylene or $C_6$–$C_{24}$-arylene optionally substituted with $C_1$–$C_{18}$-alkyl linear or branched, $C_5$–$C_{12}$-cycloalkyl or $C_1$–$C_{18}$ alkoxy;

$R_4$ is $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

$R_5$ is $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

$R_6$ $C_1$–$C_{24}$-alkyl linear or branched, optionally containing heteroatoms N, O, P, or, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

A is a direct bond, $C_1$–$C_{30}$-alkylidene optionally containing heteroatoms N, O, P, or S, >NH, >NR$_1$, —S—, >S(O), >S(O)$_2$, or —O—;

D is a q-valent group $C_1$–$C_{30}$-alkylene linear, branched, optionally containing heteroatoms N, O, P, or S, $C_1$–$C_{30}$-alkylidene optionally containing heteroatoms N, O, P, or S, $C_5$–$C_{12}$-cycloalkylene optionally containing heteroatoms N, O, P, or S or $C_6$–$C_{24}$-arylene optionally substituted with $C_1$–$C_{18}$-alkyl linear or branched, $C_5$–$C_{12}$-cycloalkyl $C_1$–$C_{18}$ alkoxy, —O—, —S—;

X is Cl, Br, F, OH including the resultant tautomeric form >P(O)H;

k is from 0 to 4;

n is from 1 to 4;

m is from 0 to 5;

p is 0 or 1;

q is from 1 to 5;

r is from 3 to 6, where the groups P—R$_6$ in formula (XIX) are a constituent of a phosphacycle, indicated by * on the bonds emanating from P, wherein the proportion by weight of the at least one first compound is from 5 to 95% by weight, and the proportion by weight of the at least one second compound is from 95 to 5% by weight.

7. A stabilized polymer comprising at least one polymer and at least one stabilizer mixture, wherein the at least one stabilizer mixture comprises:

a) at least one first compound selected from the group of compounds of the formulae (I) to (IX) and (XI) to (XV)

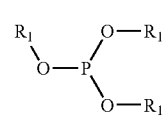
(I)

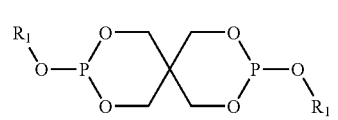
(II)

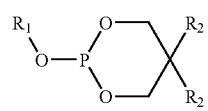
(III)

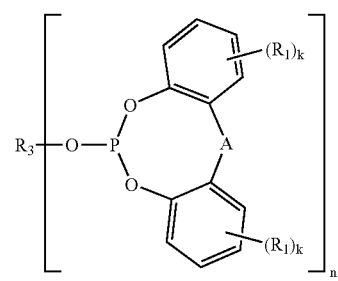
(IV)

-continued

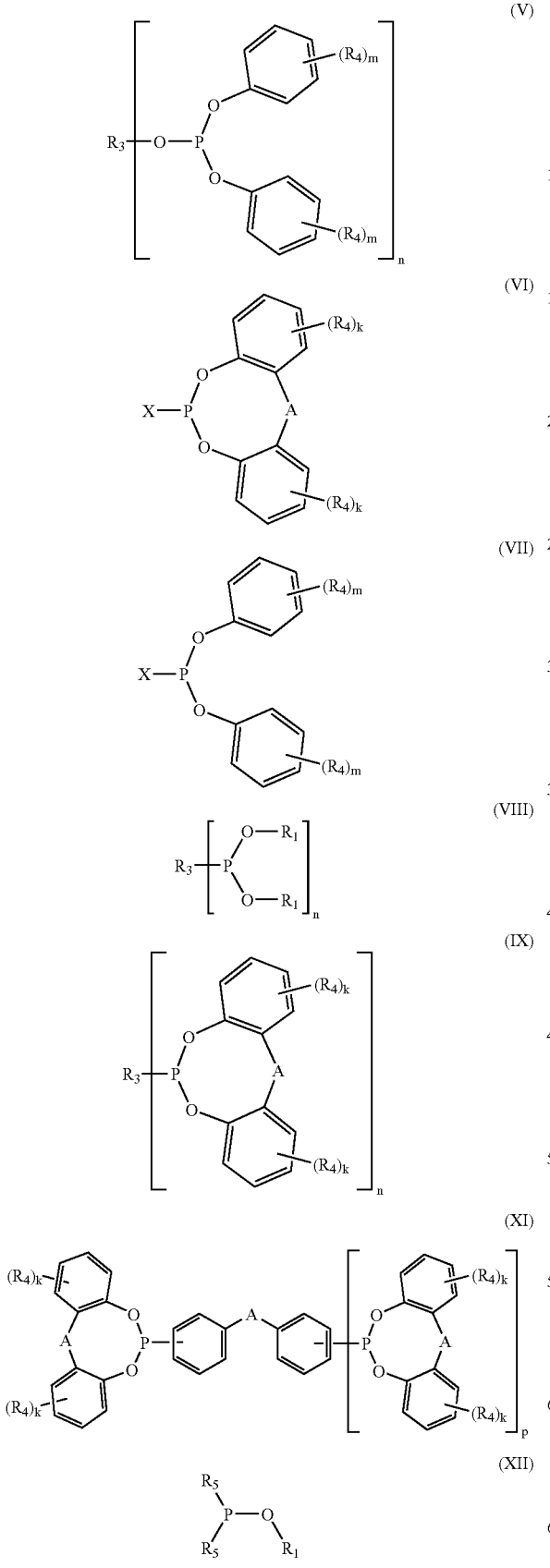

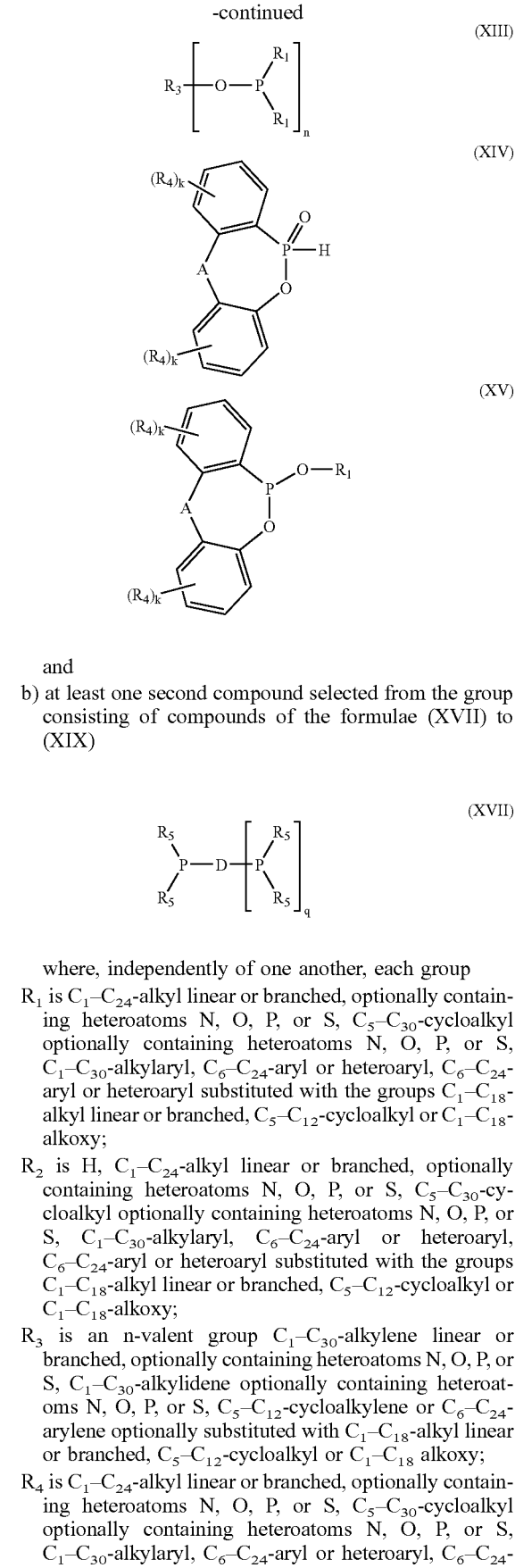

and b) at least one second compound selected from the group consisting of compounds of the formulae (XVII) to (XIX)

where, independently of one another, each group $R_1$ is $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

$R_2$ is H, $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

$R_3$ is an n-valent group $C_1$–$C_{30}$-alkylene linear or branched, optionally containing heteroatoms N, O, P, or S, $C_1$–$C_{30}$-alkylidene optionally containing heteroatoms N, O, P, or S, $C_5$–$C_{12}$-cycloalkylene or $C_6$–$C_{24}$-arylene optionally substituted with $C_1$–$C_{18}$-alkyl linear or branched, $C_5$–$C_{12}$-cycloalkyl or $C_1$–$C_{18}$ alkoxy;

$R_4$ is $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$- aryl or heteroaryl substituted with the groups $C_1$–$C_{18}$-alkyl linear or branched, $C_5$–$C_{12}$-cycloalkyl or $C_1$–$C_{18}$-alkoxy;

$R_5$ is $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

$R_6$ $C_1$–$C_{24}$-alkyl linear or branched, optionally containing heteroatoms N, O, P, or, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

A is a direct bond, $C_1$–$C_{30}$-alkylidene optionally containing heteroatoms N, O, P, or S, >NH, >NR$_1$, —S—, >S(O), >S(O)$_2$, —O—;

D is a q-valent group $C_1$–$C_{30}$-alkylene linear, branched, optionally containing heteroatoms N, O, P, or S, $C_1$–$C_{30}$-alkylidene optionally containing heteroatoms N, O, P, or S, $C_5$–$C_{12}$-cycloalkylene optionally containing heteroatoms N, O, P, or S or $C_6$–$C_{24}$-arylene optionally substituted with $C_1$–$C_{18}$-alkyl linear or branched, $C_5$–$C_{12}$-cycloalkyl $C_1$–$C_{18}$ alkoxy, —O—, —S—;

X is Cl, Br, F, OH including the resultant tautomeric form >P(O)H;

k is from 0 to 4;

n is from 1 to 4;

m is from 0 to 5;

p is 0 or 1;

q is from 1 to 5;

r is from 3 to 6, where the groups P—$R_6$ in formula (XIX) are a constituent of a phosphacycle, indicated by * on the bonds emanating from P, wherein the proportion by weight of the at least one first compound is from 10 to 90% by weight, and the proportion by weight of the at least one second compound is from 90 to 10% by weight.

8. The process of claim 5, wherein the stabilizing mixture is in the form selected from the group consisting of solid, liquid/molten, in solution, and a solid masterbatch.

9. The process of claim 5, wherein the stabilizing mixture is added in the amount of from 0.005 to 3% by weight, based on the polymer.

10. The process of claim 5, wherein the stabilizing mixture is added in the amount of from 0.01 to 2% by weight, based on the polymer.

11. A polymer made in accordance with the process of claim 5.

12. A stabilized polymer comprising at least one polymer selected from the group consisting of polyolefins and polyesters; and at least one stabilizer mixture, wherein the at least one stabilizer mixture comprises a) at least one first compound selected from the group of compounds of the formulae (I) to (IX) and (XI) to (XV)

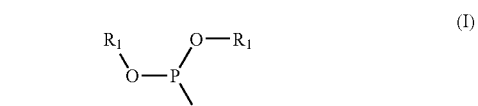
(I)

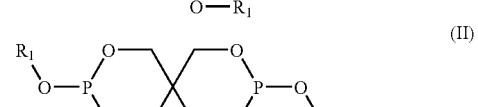
(II)

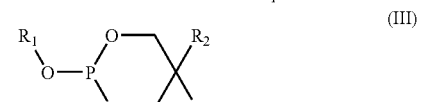
(III)

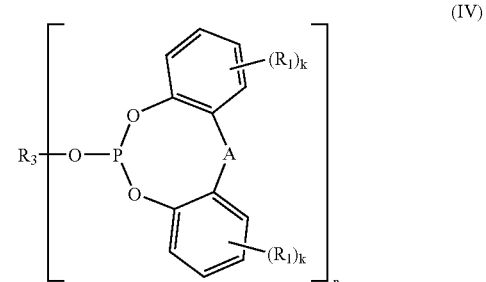
(IV)

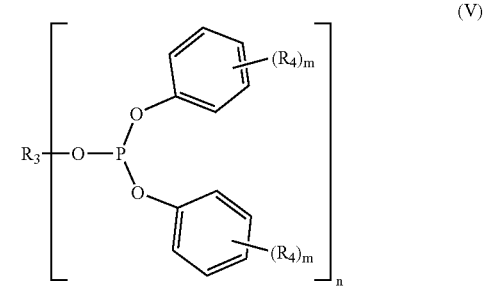
(V)

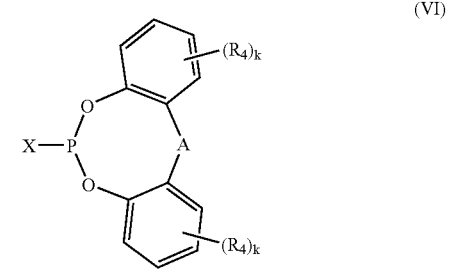
(VI)

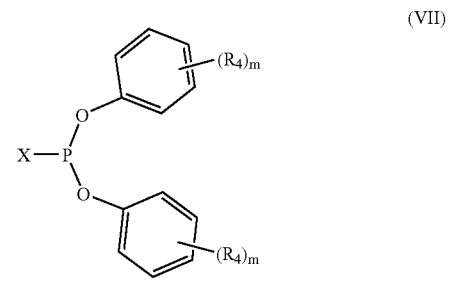
(VII)

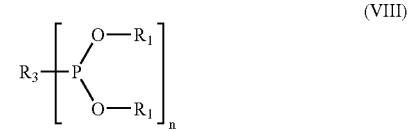
(VIII)

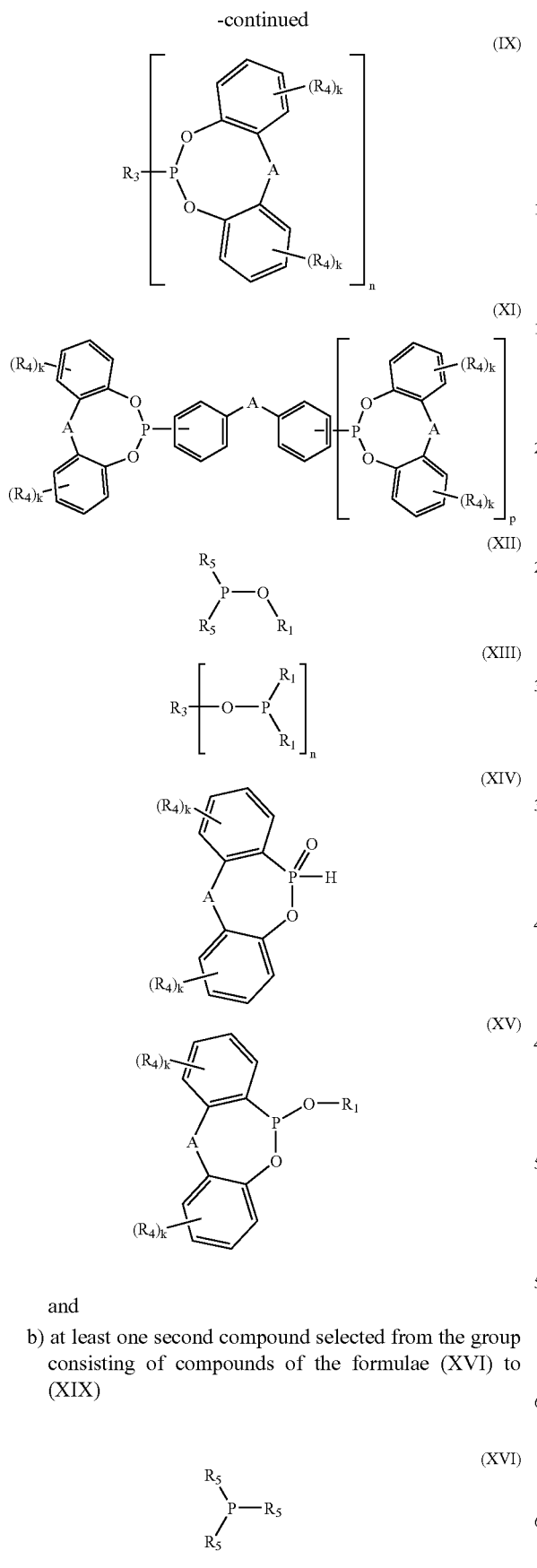

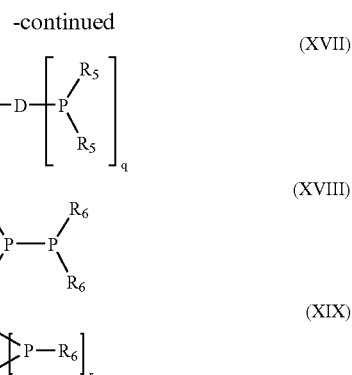

and b) at least one second compound selected from the group consisting of compounds of the formulae (XVI) to (XIX)

where, independently of one another, each group $R_1$ is $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_5$–$C_{12}$-cycloalkyl or $C_1$–$C_{18}$-alkoxy;

$R_2$ is H, $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

$R_3$ is an n-valent group $C_1$–$C_{30}$-alkylene linear or branched, optionally containing heteroatoms N, O, P, or S, $C_1$–$C_{30}$-alkylidene optionally containing heteroatoms N, O, P, or S, $C_5$–$C_{12}$-cycloalkylene or $C_6$–$C_{24}$-arylene optionally substituted with $C_1$–$C_{18}$-alkyl linear or branched, $C_5$–$C_{12}$-cycloalkyl or $C_1$–$C_{18}$ alkoxy;

$R_4$ is $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

$R_5$ is $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

$R_6$ $C_1$–$C_{24}$-alkyl linear or branched, optionally containing heteroatoms N, O, P, or, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

A is a direct bond, $C_1$–$C_{30}$-alkylidene optionally containing heteroatoms N, O, P, or S, >NH, >NR$_1$, —S—, >S(O), >S(O)$_2$, —O—;

D is a q-valent group $C_1$–$C_{30}$-alkylene linear, branched, optionally containing heteroatoms N, O, P, or S, $C_1$–$C_{30}$-alkylidene optionally containing heteroatoms N, O, P, or S, $C_5$–$C_{12}$-cycloalkylene optionally containing heteroatoms N, O, P, or S or $C_6$–$C_{24}$-arylene optionally substituted with $C_1$–$C_{18}$-alkyl linear or branched, $C_5$–$C_{12}$-cycloalkyl $C_1$–$C_{18}$ alkoxy, —O—, —S—;

X is Cl, Br, F, OH including the resultant tautomeric form >P(O)H;
k is from 0 to 4;
n is from 1 to 4;
m is from 0 to 5;
p is 0 or 1;
q is from 1 to 5;
r is from 3 to 6, where the groups P—R₆ in formula (XIX) are a constituent of a phosphacycle, indicated by * on the bonds emanating from P.

13. A stabilized polymer comprising
at least one polymer selected from the group consisting of polyolefins and polyesters; and
at least one stabilizer mixture, wherein the at least one stabilizer mixture comprises
a) at least one first compound selected from the group of compounds of the formulae (I) to (XV)

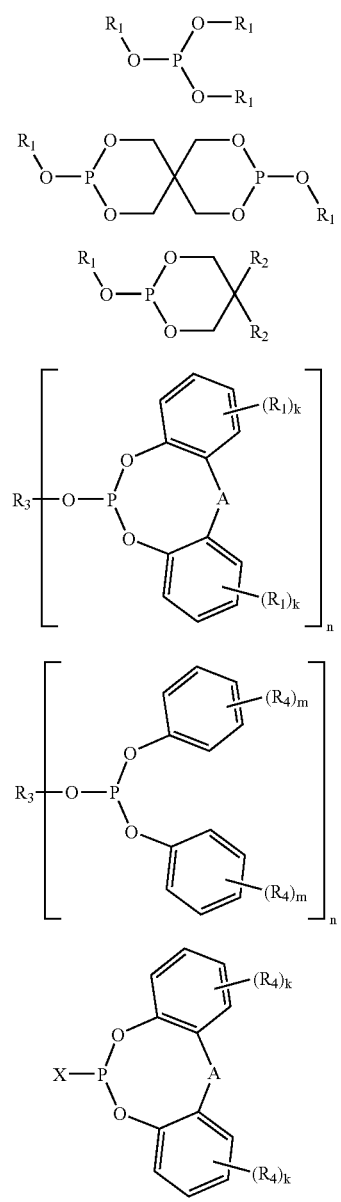

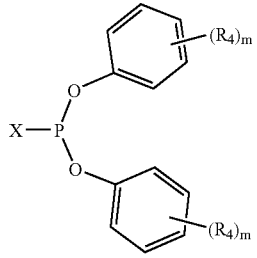

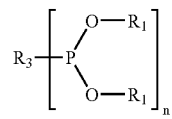

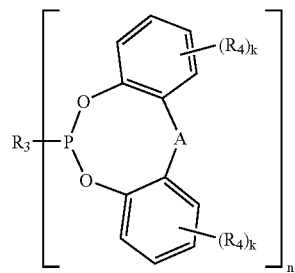

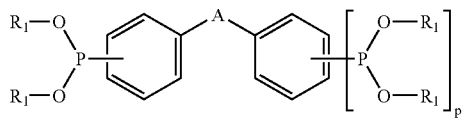

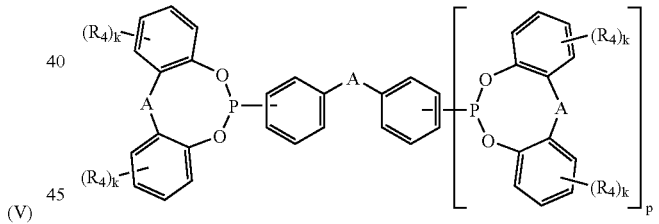

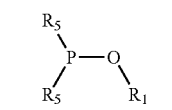

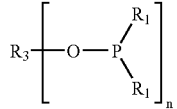

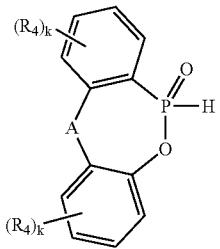

-continued

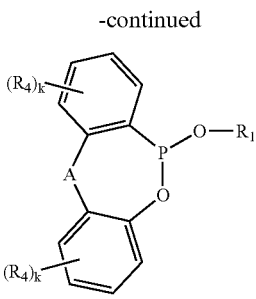
(XV)

and
b) at least one second compound selected from the group consisting of compounds of the formulae (XVII) to (XIX)

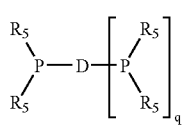
(XVII)

where, independently of one another, each group $R_1$ is $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_5$–$C_{12}$-cycloalkyl or $C_1$–$C_{18}$-alkoxy;

$R_2$ is H, $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

$R_3$ is an n-valent group $C_1$–$C_{30}$-alkylene linear or branched, optionally containing heteroatoms N, O, P, or S, $C_1$–$C_{30}$-alkylidene optionally containing heteroatoms N, O, P, or S, $C_5$–$C_{12}$-cycloalkylene or $C_6$–$C_{24}$-arylene optionally substituted with $C_1$–$C_{18}$-alkyl linear or branched, $C_5$–$C_{12}$-cycloalkyl or $C_1$–$C_{18}$ alkoxy;

$R_4$ is $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

$R_5$ is $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

$R_6$ $C_1$–$C_{24}$-alkyl linear or branched, optionally containing heteroatoms N, O, P, or, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

A is a direct bond, $C_1$–$C_{30}$-alkylidene optionally containing heteroatoms N, O, P, or S, >NH, >$NR_1$, —S—, >S(O), >S(O)$_2$, —O—;

D is a q-valent group $C_1$–$C_{30}$-alkylene linear, branched, optionally containing heteroatoms N, O, P, or S, $C_1$–$C_{30}$-alkylidene optionally containing heteroatoms N, O, P, or S, $C_5$–$C_{12}$-cycloalkylene optionally containing heteroatoms N, O, P, or S or $C_6$–$C_{24}$-arylene optionally substituted with $C_1$–$C_{18}$-alkyl linear or branched, $C_5$–$C_{12}$-cycloalkyl $C_1$–$C_{18}$ alkoxy, —O—, —S—;

X is Cl, Br, F, OH including the resultant tautomeric form >P(O)H;

k is from 0 to 4;

n is from 1 to 4;

m is from 0 to 5;

p is 0 or 1;

q is from 1 to 5;

r is from 3 to 6, where the groups P—$R_6$ in formula (XIX) are a constituent of a phosphacycle, indicated by * on the bonds emanating from P.

14. A masterbatch composition comprising
from 90 to 20% by weight of at least one polymer selected from the group (1) to (14) and (16) to (29), wherein group (1) is polymers of mono olefins or diolefins, (2) is mixtures of polymers of monoolefins and diolefins, (3) is copolymers of monoolefins and diolefins, (4) is hydrocarbon resins, (5) is polystyrenes, (6) is copolymers of styrene or alpha-methylstyrene with dienes or acrlic derivatives, (7) is graft copolymers of styrene or alpha-methylstyrene, (8) is halogen-containing polymers, (9) is polymers derived from alpha,beta-unsaturated acids and derivatives thereof,

(10) is copolymers of alpha,beta-unsaturated acids and derivatives thereof with each other or with other unsaturated monomers,

(11) is polymers derived from unsaturated alcohols and amines or the acyl derivatives or acetals thereof; or copolymers thereof with olefins,

(12) is homopolymers and copolymers of cyclic ethers, or copolymers thereof with bisglycidyl ethers,

(13) is polyacetals or polyoxymethylenes containing comonomers,

(14) is polyphenylene oxides or sulphides, and mixtures thereof with styrene polymers or polyamides,

(16) is polyamides and copolyamides, block copolymers of polyamides with polyolefins, olefin copolymers, ionomers or chemically bonded or grafted elastomers; or with polyethers; polyamides or copolyamides modified with EPDM or ABS; or polyamides condensed during processing,

(17) is polyimides, polyamide-imides or polybenzimidazoles,

(18) is polyesters, block polyether-esters derived from hydroxyl-terminated polyethers; or polyesters modified with polycarbonates or MBS,

(19) is polycarbonates or polyester carbonates,

(20) is polysulphones, polyether sulphones or polyether ketones,

(21) is crosslinked polymers derived from aldehydes phenols, urea or melamine,

(22) is drying or non-drying alkyd resins,

(23) is unsaturated polyester resins or halogen-containing modifications thereof,

(24) is crosslinkable acrylic resins derived from substituted acrylates,

(25) is alkyd resins, polyester resins or acrylic resins crosslinked with melamine resins, urea resins, polyisocyanates or epoxy resins,
(26) is crosslinked epoxy resins derived from polyepoxides,
(27) is cellulose, natural rubber, gelatin and derivatives thereof which have been chemically modified in a polymer-homologous manner, cellulose ethers rosins and derivatives thereof,
(28) is mixtures of the polymers of groups (1) to (14) and (15) to (27), and
(29) is pure monomeric natural and synthetic organic substances or mixtures thereof, and from 10 to 80% by weight of at least one stabilizer mixture, wherein the at least one stabilizer mixture comprises a) at least one first compound selected from the group of compounds of the formulae (I) to (XV)

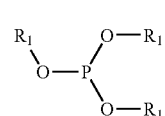
(I)

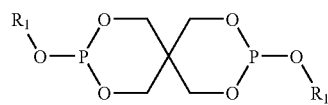
(II)

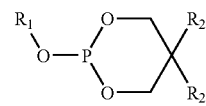
(III)

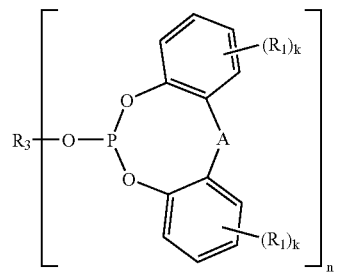
(IV)

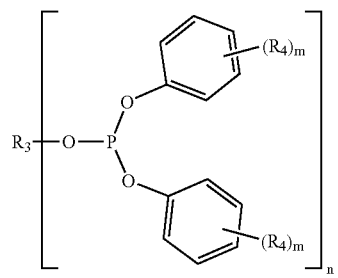
(V)

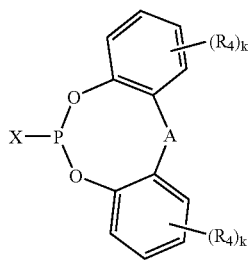
(VI)

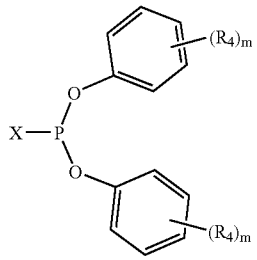
(VII)

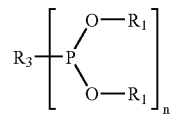
(VIII)

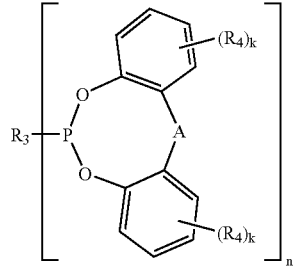
(IX)

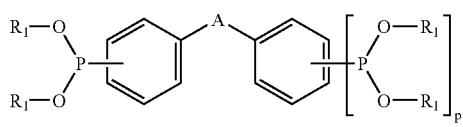
(X)

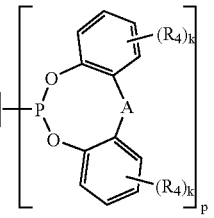
(XI)

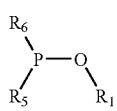
(XII)

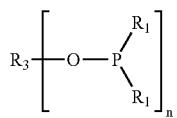
(XIII)

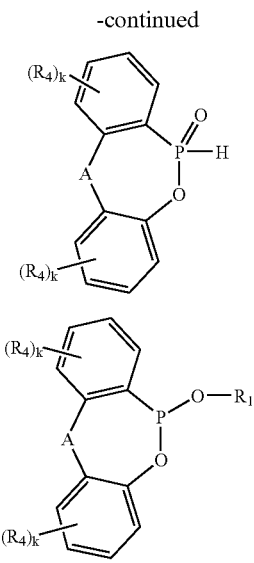

(XIV)

(XV)

and b) at least one second compound selected from the group consisting of compounds of the formulae (XVI) to (XIX)

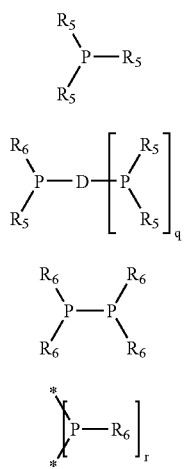

(XVI)

(XVII)

(XVIII)

(XIX)

where, independently of one another, each group $R_1$ is $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_5$–$C_{12}$-cycloalkyl or $C_1$–$C_{18}$-alkoxy;

$R_2$ is H, $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

$R_3$ is an n-valent group $C_1$–$C_{30}$-alkylene linear or branched, optionally containing heteroatoms N, O, P, or S, $C_1$–$C_{30}$-alkylidene optionally containing heteroatoms N, O, P, or S, $C_5$–$C_{12}$-cycloalkylene or $C_6$–$C_{24}$-arylene optionally substituted with $C_1$–$C_{18}$-alkyl linear or branched, $C_5$–$C_{12}$-cycloalkyl or $C_1$–$C_{18}$ alkoxy;

$R_4$ is $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

$R_5$ is $C_1$–$C_{24}$-alkyl linear or branched, optionally containing heteroatoms N, O, P, or S, $C_5$–$C_{30}$-cycloalkyl optionally containing heteroatoms N, O, P, or S, $C_1$–$C_{30}$-alkylaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

$R_6$ $C_1$–$C_{24}$-alkyl linear or branched, optionally containing heteroatoms N, O, P, or, $C_5$–$C_{30}$-cycloalkyl optionally containing heteroatoms N, O, P, or S, $C_1$–$C_{30}$-alkylaryl, $C_6$–$C_{24}$-aryl or heteroaryl, $C_6$–$C_{24}$-aryl or heteroaryl substituted with the groups $C_1$–$C_{18}$-alkyl linear or branched, $C_5$–$C_{12}$-cycloalkyl or $C_1$–$C_{18}$-alkoxy;

A is a direct bond, $C_1$–$C_{30}$-alkylidene optionally containing heteroatoms N, O, P, or S, >NH, >NR$_1$, —S—, >S(O), >S(O)$_2$, —O—;

D is a q-valent group $C_1$–$C_{30}$-alkylene linear, branched, optionally containing heteroatoms N, O, P, or S, $C_1$–$C_{30}$-alkylidene optionally containing heteroatoms N, O, P, or S, $C_5$–$C_{12}$-cycloalkylene optionally containing heteroatoms N, O, P, or S or $C_6$–$C_{24}$-arylene optionally substituted with $C_1$–$C_{18}$-alkyl linear or branched, $C_5$–$C_{12}$-cycloalkyl $C_1$–$C_{18}$ alkoxy, —O—, —S—;

X is Cl, Br, F, OH including the resultant tautomeric form >P(O)H;

k is from 0 to 4;

n is from 1 to 4;

m is from 0 to 5;

p is 0 or 1;

q is from 1 to 5;

r is from 3 to 6, where the groups P—$R_6$ in formula (XIX) are a constituent of a phosphacycle, indicated by * on the bonds emanating from P.

15. A masterbatch composition according to claim 14, wherein the proportion by weight in the stabilizer mixture of the at least one first compound is from 1 to 99% by weight, and the proportion by weight of the at least one second compound is from 99 to 1% by weight.

16. A masterbatch composition according to claim 14, wherein the proportion by weight in the stabilizer mixture of the at least one first compound is from 5 to 95% by weight, and the proportion by weight of the at least one second compound is from 95 to 5% by weight.

17. A masterbatch composition according to claim 14, wherein the proportion by weight in the stabilizer mixture of the at least one first compound is from 10 to 90% by weight, and the proportion by weight of the at least one second compound is from 90 to 10% by weight.

* * * * *